United States Patent [19]
Becker et al.

[11] 3,787,196
[45] Jan. 22, 1974

[54] APPARATUS FOR FEEDING GOBS OF MOLTEN VITREOUS OR PLASTIC MATERIAL INTO MOLDS OF A MACHINE FOR FORMING BOTTLES OR SIMILAR CONTAINERS WITH CONTROL MEANS FOR CONTROLLING THE MOVEMENT OF THE MOLDS

[75] Inventors: Kurt Becker, Obernkirchen; Hans-Georg Seidel, Rinteln, both of Germany

[73] Assignee: Hermann Heye, Obernkirchen, Germany

[22] Filed: Mar. 1, 1973

[21] Appl. No.: 337,193

Related U.S. Application Data
[62] Division of Ser. No. 163,171, July 16, 1971, abandoned.

[30] Foreign Application Priority Data
July 20, 1970 Germany.............................. 2035926

[52] U.S. Cl...................... 65/164, 65/211, 65/212, 65/304, 65/361, 141/167, 141/180, 264/297, 425/155
[51] Int. Cl............................................. C03b 5/30
[58] Field of Search..... 65/164, 211, 212, 304, 361; 141/250–255, 257, 260–263, 167, 180; 164/157; 264/297; 425/155

[56] References Cited
UNITED STATES PATENTS

| | | | |
|---|---|---|---|
| 2,284,508 | 5/1942 | Bert..................................... | 65/361 |
| 3,162,522 | 12/1964 | Tingley............................. | 65/304 X |
| 2,772,705 | 12/1956 | Anderson........................... | 141/167 |
| 3,294,037 | 12/1966 | Hoag et al. ........................ | 425/155 |

Primary Examiner—Robert L. Lindsay, Jr.
Attorney, Agent, or Firm—Michael S. Striker

[57] ABSTRACT

Apparatus for feeding gobs of molten vitreous or plastic material into molds of a machine for forming bottles or similar containers from such material in which the molds are moved along an endless path past a loading station at which gob-feeding means are stationarily arranged above the path of the molds, and in which each mold is momentarily arrested when axially aligned with the gob-feeding means so that a gob may be dropped in vertical direction into the respective mold. The molds are transported along a major portion of the endless path with uniform speed equally spaced from each other, but upstream and downstream of the loading station decelerated or accelerated in such a manner so as to arrive at a point downstream of the loading station at the same time as if they would have been moved continuously with said uniform speed.

13 Claims, 27 Drawing Figures

INVENTORS
Kurt BECKER
Hans-Georg SEIDEL

By Michael S. Striker their ATTORNEY

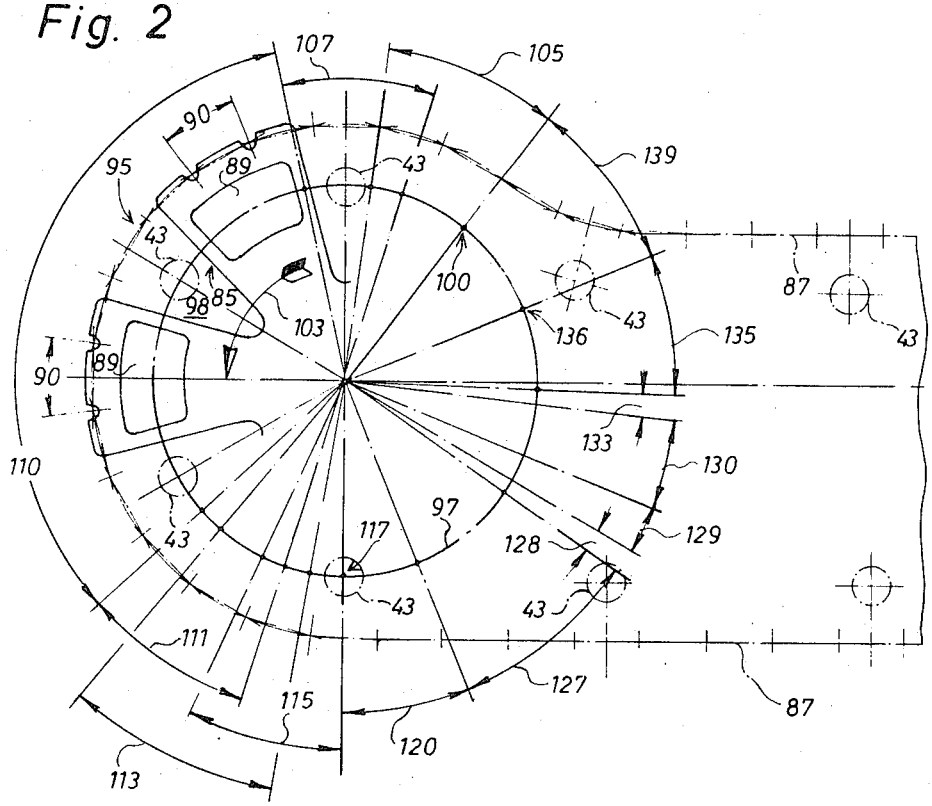

INVENTORS
KURT BECKER
HANS-GEORG SEIDEL

BY: Michael S. Striker
ATTORNEY

INVENTORS
Kurt BECKER
Hans-Georg SEIDEL

By Michael S. Strike their ATTORNEY

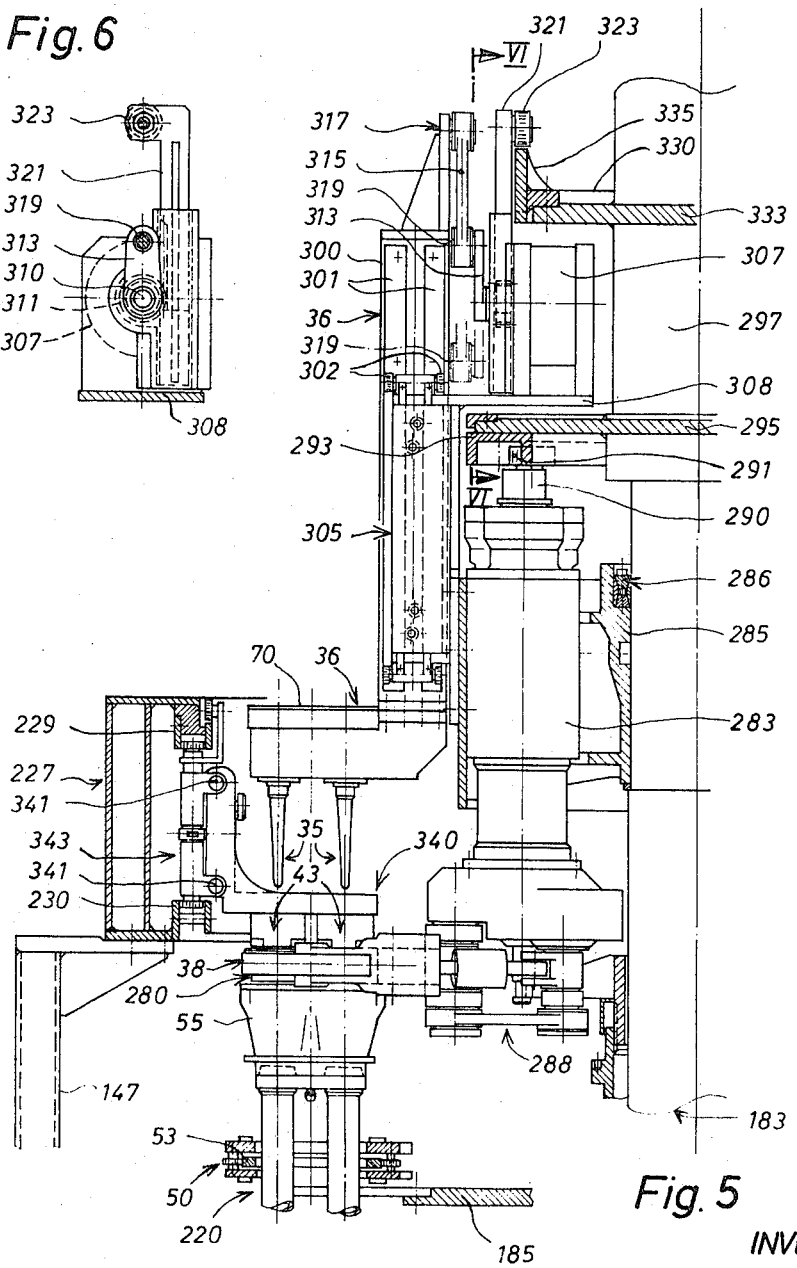

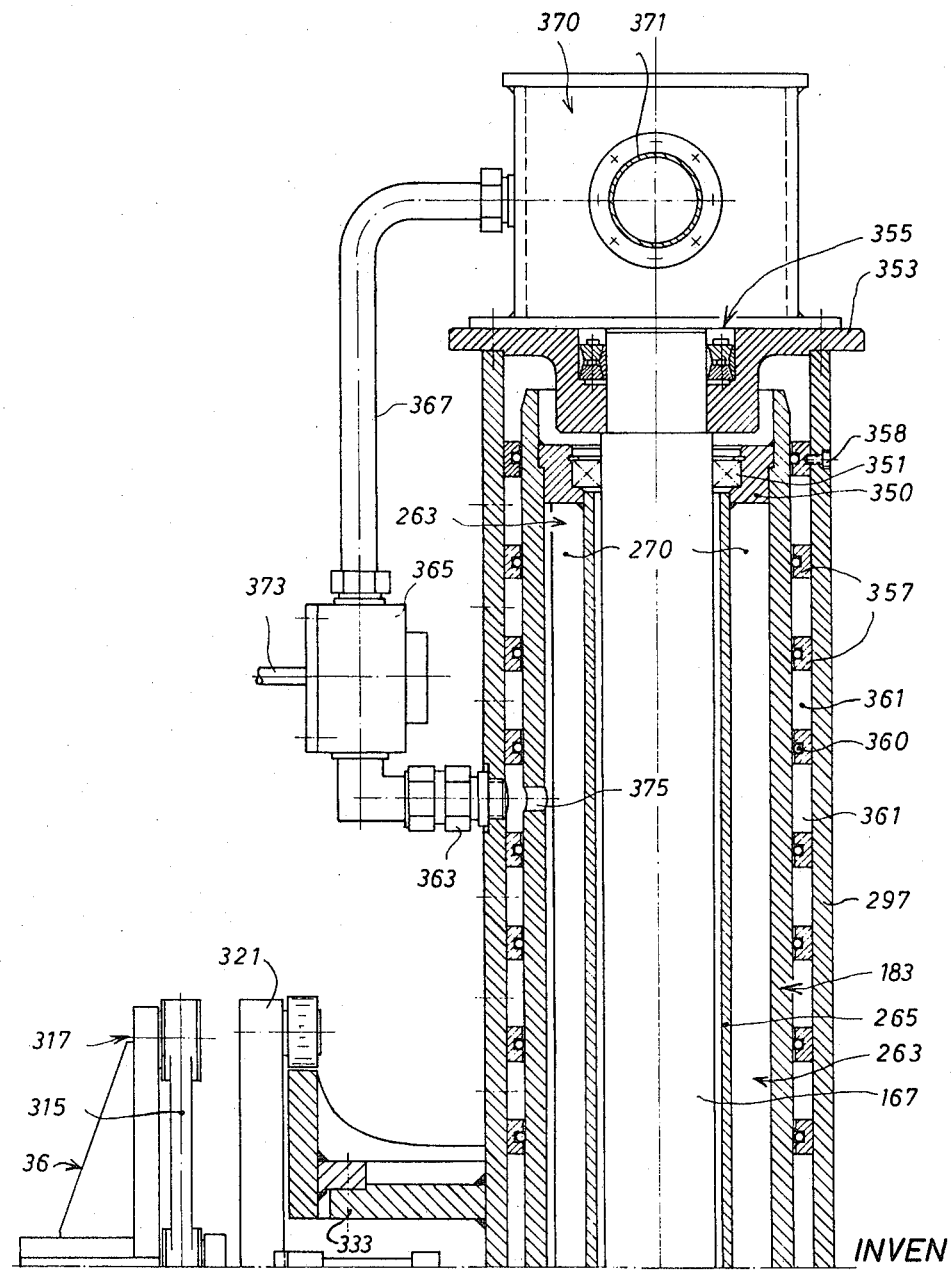

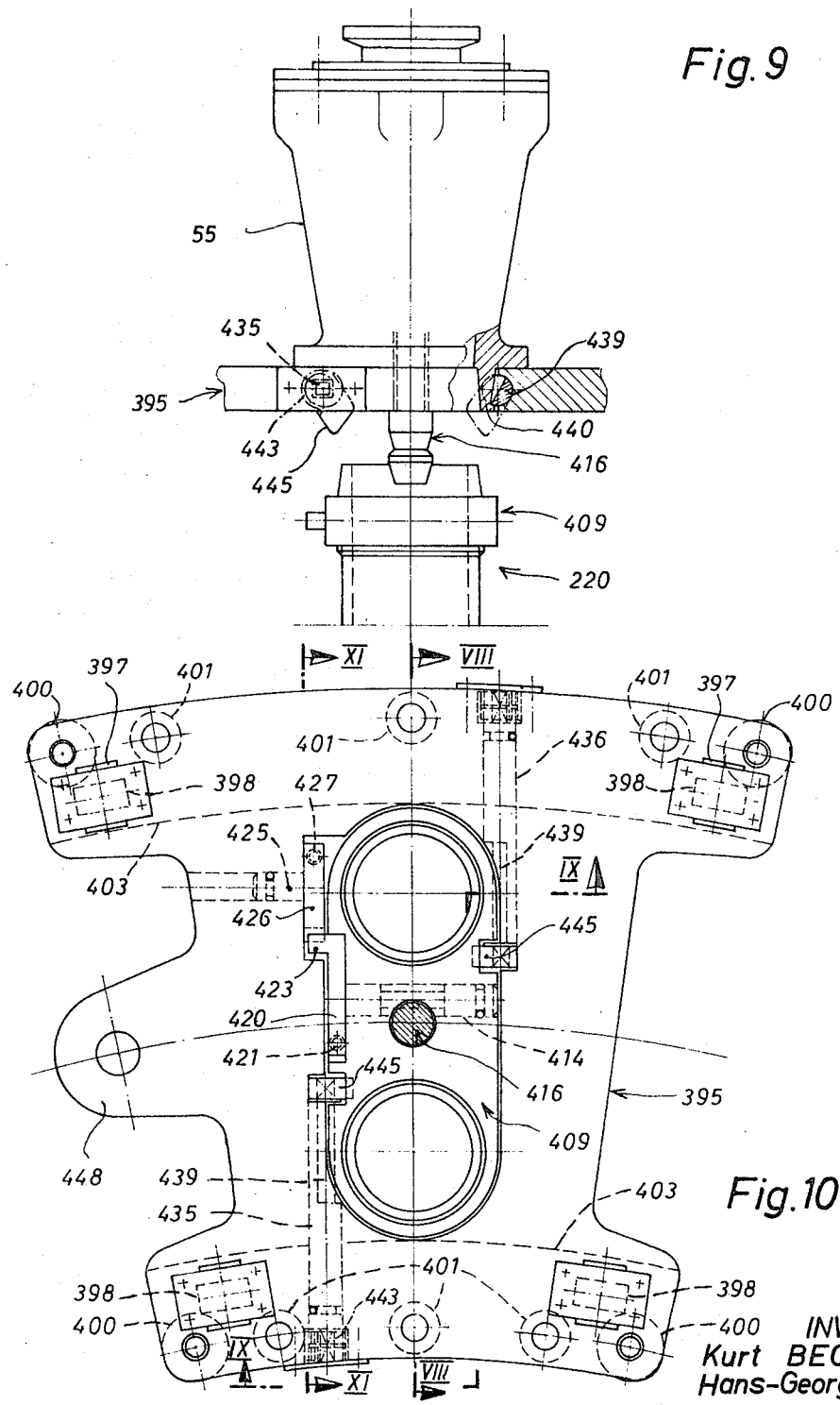

INVENTORS
KURT BECKER
HANS-GEORG SEIDEL

BY: Michael S. Striker
ATTORNEY

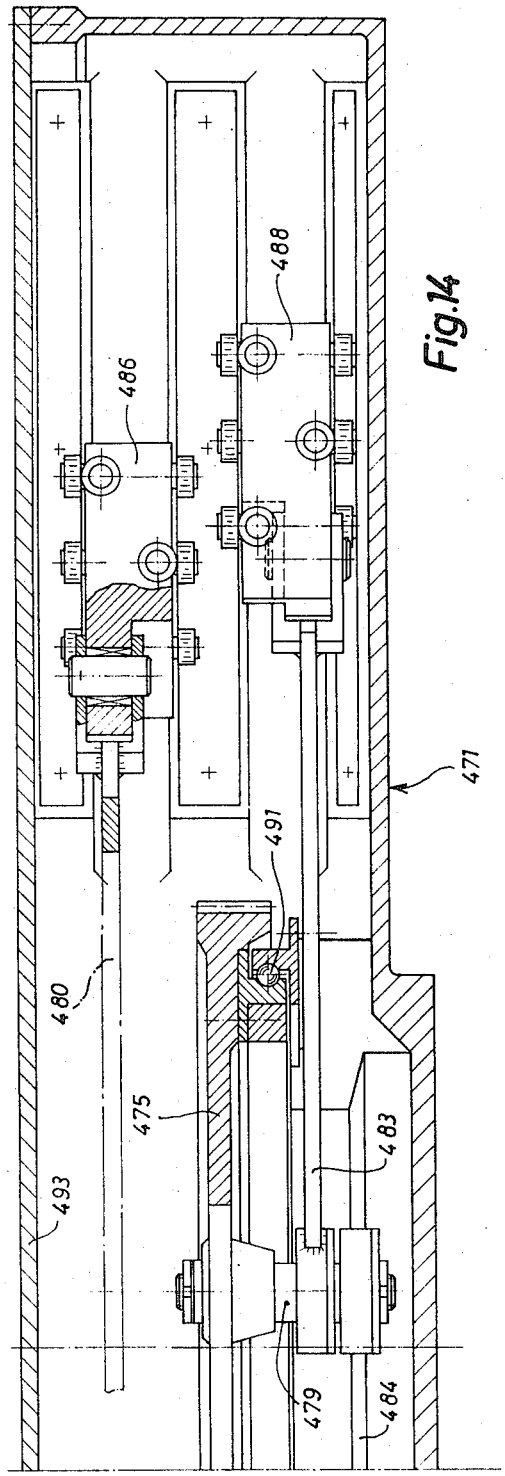
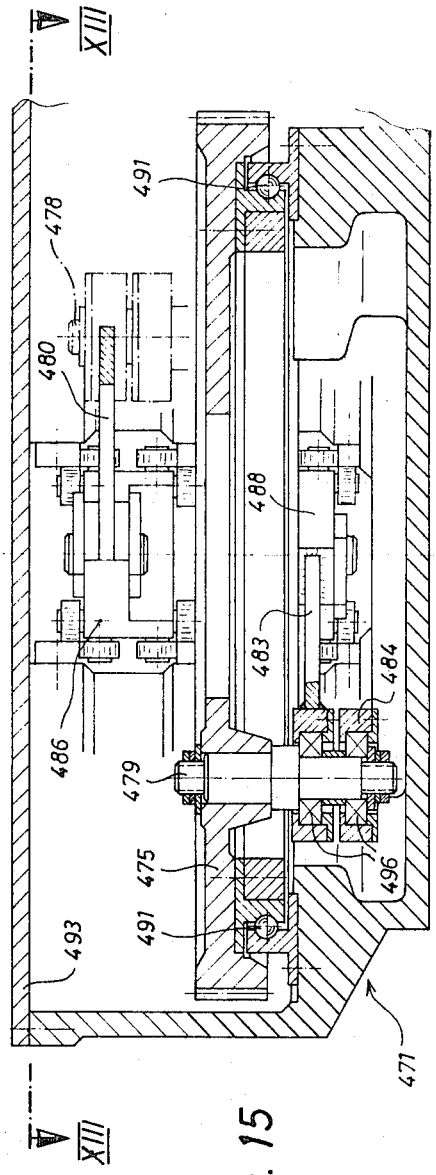

INVENTORS
KURT BECKER
HANS-GEORG SEIDEL

BY: Michael S. Striker
ATTORNEY

APPARATUS FOR FEEDING GOBS OF MOLTEN VITREOUS OR PLASTIC MATERIAL INTO MOLDS OF A MACHINE FOR FORMING BOTTLES OR SIMILAR CONTAINERS WITH CONTROL MEANS FOR CONTROLLING THE MOVEMENT OF THE MOLDS

CROSS-REFERENCES TO RELATED APPLICATIONS

The present application is a divisional application of the copending application Ser. No. 163,171 filed July 16, 1971 now abandoned.

BACKGROUND OF THE INVENTION

The present invention relates to an apparatus for feeding a gob of for instance molten vitreous material in a mold, for instance a press mold of a machine for forming bottles or similar containers, whereby the gob during the feeding thereof, moves along the longitudinal axis of the mold.

A known machine of this type is used in the Hartford-Empire-Machine Type 28 of the Emhart Mfg. Co. (see also the book "Glas Maschine" by W. Giegerich and W. Trier, published by Springer, 1964, pp. 236 gg). In this machine, several molds are moved continuously with uniform speed along an endless path. The gobs are fed into a three-part chute which for a short time is moved synchronously with the mold to be fed, so that the gob obtains a speed component in the same direction and of the same magnitude as the speed of the mold to be fed. The gob is released when the molten gob has the same speed as the mold so that the gob may drop in vertical direction into the respective mold. A disadvantage of this method is that the gob will have one-sided contact with the chute which leads, on the one hand, to an undesired deformation of the gob, and on the other hand, to an asymmetrical cooling thereof. These disadvantages are unacceptable especially if the machine is used for the production of thin-walled hollow glass articles, and if the machine has a relatively high production rate.

SUMMARY OF THE INVENTION

It is an object of the present invention to feed a gob from a gob supply means into a mold which is normally moved along a predetermined path without contacting the gob on its way from the gob supply means to the mold with any member.

This object is solved according to the present invention by momentarily arresting the mold beneath a stationarily arranged gob supply means so that the gob may be freely dropped in vertical direction into the mold. This facilitates in a novel, highly favorable manner the production of uniformly perfect articles, even extreme thin-walled hollow glass or plastic bodies and even if such bodies are produced in quick succession.

According to one embodiment of the present invention, the mold which is normally moved with uniform speed along its endless path is first accelerated and then decelerated until it comes to a stop at the loading station, at which the mold is held a short time stationarily, whereafter the mold is again accelerated to the uniform speed. This is especially advantageous since the acceleration of the mold after loading thereof may be held relatively low so that any action imparted to the gob in the mold due to the acceleration thereof, will be relatively small.

According to another embodiment, the mold which during a major portion of its endless path is moved with uniform speed, is first decelerated until it comes to a stop at the loading station, whereafter it is held for a moment stationarily at the loading station and subsequently thereto, the mold is accelerated and finally again decelerated to its normal uniform speed.

Preferably, the acceleration, deceleration of the mold and the time it is held stationary, are chosen in such a manner that the mold arrives at a point downstream of the loading station at the same time as if the mold would have been moved along its whole path with the same uniform speed. This facilitates operation of the machine at which a plurality of operating stations are arranged along the endless path along which the molds move.

The machine according to the present invention mainly comprises at least one carriage movable along a predetermined path, upright mold means on the carriage, a loading station at a point of said path comprising stationary gob supply means for dropping a gob of vitreous or plastic material in vertical direction into the mold means, and means cooperating with the carriage for moving the same along the path and for arresting the carriage for a short time at the loading station while a gob is fed into the mold.

The endless predetermined path along which the carriage is moved may be defined by an endless track means arranged on a turntable turnable about an axis and the carriage is mounted on such track means. In this case, the machine may comprise first drive means cooperating with the turntable for rotating the same about the axis, means cooperating with the carriage and the turntable for coupling the carriage to the turntable for movement therewith, and for decoupling said carriage from the turntable so that the carriage may move along the track means relative to the turntable, and second drive means connected to the carriage for moving the same along said track means relative to the turntable when the carriage is decoupled from the turntable.

The aforementioned first drive means may drive the turntable about its axis at a predetermined uniform speed, and the second drive means may move the carriage relative to the turntable between a first point along the path upstream of the loading station and a second point downstream thereof, and arrest the carriage at the loading station for such a time so that the carriage arrives at the second point at the same time as if the carriage would have moved along the whole path together with the turntable at the uniform speed of the latter.

The endless track means on the turntable may be in the form of a circle coaxial with the axis of the turntable, but if certain parts of the machine make it impossible to load the molds at a point of this concentric track, then the track may include a portion deviating from the concentric circle so that the mold, during the loading thereof, may be either radially inwardly or radially outwardly moved relative to the concentric track for the purpose of loading.

The second drive means of the apparatus according to the present invention for moving the carriage relative to the turntable, may comprise a pneumatic motor mounted on the turntable for movement therewith and having a drive shaft, a drive arm fixed to the drive shaft for turning therewith and linked to the carriage, and means for controlling the pneumatic motor and comprising a pilot arm fixed at one end to the drive shaft for turning therewith, a connecting rod pivotably connected at one end to the other end of the pilot arm, a roller mounted on the other end of the connecting rod, stationary pilot track means along which the roller moves, and elongated guide means connected to the roller and mounted on the turntable movable relative thereto in substantially radial direction.

The machine preferably includes also means for substantially compensating the inertia forces and moments resulting from the movement of the second drive means and the resulting movement of the carriage relative to the turntable. Such an arrangement will favorably influence smooth operation of all machine parts, and also contribute to an improved quality of the produced articles.

In addition detrimental mechanical reactions onto the machine are prevented in this manner.

In a machine in which a plurality of carriages are arranged on the track means of the turntable, the compensating means may comprise a gear meshing with a gear rim provided on the turntable and turnable about an axis parallel to that of the turntable, in which a pair of diametrically arranged pins are provided on the gear which are coupled by connecting rods to two pairs of weights located outside the gear on opposite sides of the turning axis thereof and which are guided on stationary guide means for movement towards and away from the turning axis, so that during turning of the gear about its turning axis, the weights in each pair will be reciprocated in opposite directions. This arrangement will result in a satisfactory compensation of detrimental mass forces.

According to a further development of the present invention, the machine may include one or a plurality of operating stations which are uniformly moved with the endless track and each of which may include at least one mold and a plunger cooperating therewith and eventually also a neck ring and two-part gripper means for aligning the neck ring with the respective mold, and each of the molds may, after loading thereof, be liftable from the carriage by lifting means which are uniformly moved along the path into the region of the gripper means, so that a gob in the mold may be pressed by the plunger during such lifting, whereafter the mold is after opening of the gripper means, again lowered onto the carriage and coupled therewith. In this way it is possible that the carriage at the moment of loading, carries only the mold so that the masses which have to be accelerated and decelerated during loading, may be held very small.

According to a further development of the machine of the present invention, the lifting means may comprise a lifting cylinder mounted on the turntable, piston means reciprocable in the lifting cylinder between the rest and the lifting position, a lifting member carried by the piston means, coupling means movable between an active position coupling the mold means to the carriage, and an inactive position for freeing the mold means for moving relative to the carriage, means carried by the lifting member and cooperating during movement of the piston means from the rest to the lifting position with the coupling means for moving the latter to the inactive position, and cooperating means on said mold means and said lifting member for coupling said mold means to the lifting member during movement of said piston from said rest to said lifting position, and for decoupling the mold means from the lifting member during movement of said piston means in the opposite direction.

In this way, the mold means are either connected to the carriage, or to the lifting means during each moment of its movement.

According to a further development of the machine of the present invention, at least one coupling cylinder is formed in the piston means and extends in the same direction as the lifting cylinder, a coupling piston is arranged in the coupling cylinder movable between a lower rest position and an upwardly displaced position, a leg is connected at one end thereof to the coupling cylinder for movement therewith and projecting from the latter downwardly beyond the lifting cylinder, whereas a roller connected to the other end of the leg is guided on a stationary curved pilot lifting track, and passage means communicate with the coupling cylinder in the region of the upper ends thereof in which means are provided for selectively connecting the passage means to the atmosphere and to a source of compressed air.

By means of the coupling cylinder it is possible to interrupt the drive between the leg and the lifting means when, for instance, the mold is not ready for operation and a lifting thereof is undesirable.

The piston means may comprise a piston, an upper and a lower piston rod, respectively projecting axially aligned with the piston to opposite sides of the latter, and the lower piston rod may extend with clearance into an outer coupling cylinder which forms a downward extension of the lifting cylinder, and sealing means may be provided for sealing the lower end of the lower piston rod against the inner surface of the outer coupling cylinder, whereas passage means may communicate with an upper portion of the outer coupling cylinder for feeding compressed air into the latter.

The outer coupling cylinder is preferably provided with a bottom wall to which a guide rod is connected which projects in a longitudinal bore provided at least in the lower piston rod, so as to prevent turning of the lifting means about its longitudinal axis and to assure thereby proper alignment of the lifting means with the mold.

In order to cool the mold, it is preferred to construct each of the lifting members as a tube open at opposite ends and axially adjustable in a corresponding bore of the piston means. The bore is in the rest position of the piston means sealed at its lower end, while in any other position of the piston means, cooling air may pass through the bore and the interior of the tube.

An especially advantageous arrangement is obtained when each of the mold means comprises a hollow mold housing open at opposite ends so that the inner surface of the mold housing forms a passage for flow of cooling air therethrough, and in which at least one mold is mounted in the mold housing spaced from the inner surface thereof. The tube of the lifting means will communicate with the aforementioned passage when the piston means moves away from its rest position thereof, so that cooling air may flow through the bore in the piston means, the tube, and the passage of the mold housing, around the mold mounted thereon and coolin the latter.

The plunger means and the lifting means of the machine of the present invention are preferably operated by pneumatic means and the arrangement may include also a switch movable with the turntable and controlling the pneumatic circuits connected to the aforementioned pneumatic means. The switch preferably comprises a switching lever having at the free end thereof a roller cooperating with a stationarily arranged mechanical shunt for moving the switch between two stable switching positions thereof. The shunt preferably comprises two tongues which define an inlet passage for receiving the roller in both switching positions of this switch, and a narrower outlet passage for the roller is adjustable to obtain as the roller passes therethrough the desired position of the switch means.

The tongues of the shunt means are preferably turnably mounted in a fixed position relative to each other and together adjustable by a selectively movable adjusting member, so that the outlet passage may be adjusted to the desired path of the roller of the switch lever. In this way it is possible to stop the movement of the plunger if a as well as the movement of the mold lifting means if a malfunction at any station arranged along the endless path are ascertained.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

BRIEF DESCRIPTION OF THE DRAWING

FIG. 2 is a schematic diagram of the turntable of the machine according to the present invention;

FIG. 5 is a partial cross-section taken along the radial line V of FIG. 3B;

FIG. 6 is a cross-section taken along the line VI—VI of FIG. 5;

FIG. 7 is a partially sectioned side view through the head of the turntable illustrating a portion of the latter upwardly arranged from the upper end of FIG. 5, at an enlarged scale;

FIG. 9 is a partially sectioned side view taken along the line IX—IX of FIG. 10;

FIG. 10 is a partially sectioned top view taken along the line X—X of FIG. 8, without the mold housing and the mold mounted therein;

FIG. 14 is a cross-section taken along the line XIV—XIV of FIG. 13;

FIG. 15 is a cross-section taken along the line XV—XV of FIG. 13;

DESCRIPTION OF THE PREFERRED EMBODIMENTS

Figure 1:
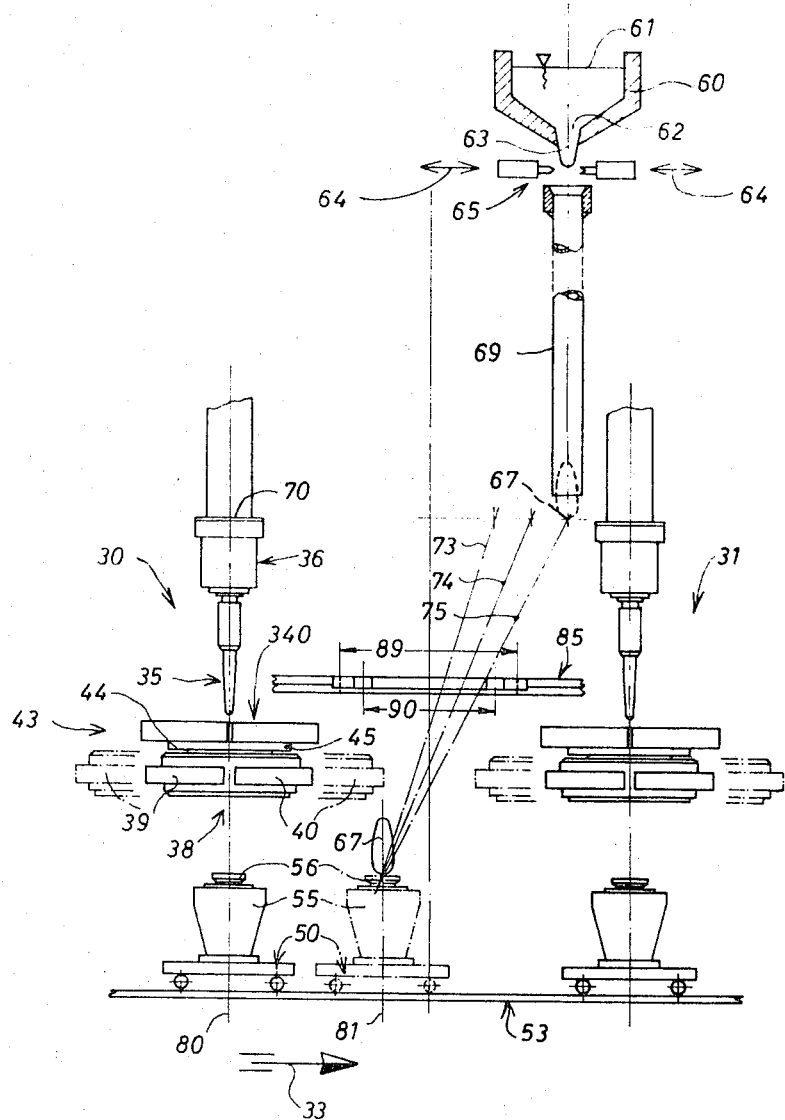
FIG. 1 is a schematic side view of part of the machine according to the present invention, which side view is shown as a developed projection as viewed by a person movable with the turntable of the machine.

In FIG. 1 there are illustrated in a development in the plane of the drawing sheet two operating stations 30 and 31 on a non-illustrated turntable. The turntable is moving in the direction of the arrow 33 with uniform speed. Each of the stations, for instance the station 30, comprises a plunger 35 with a plunger carrier 36, gripper means 38 comprising two halves 39 and 40, and a neck ring 43 comprising two halves 44 and 45, as well as a carriage 50 which is movable on track means 53 which are uniformly moved together with the non-illustrated turntable. Coupled to each carriage 50 is a mold housing 55 in which one or a plurality of molds (for instance) 56 are suspended.

FIG. 1 further illustrates a channel 60 which is up to the level 61 filled with molten vitreous or plastic material and which is provided at the bottom thereof with one or a plurality of outlets 62 through each of which a strand of molten metal 63 may pass. Strand 63 is separated into individual gobs 67 by shear means 65 which are movable in direction of the double arrow 64 so that the gobs 67 may drop freely in vertical direction through a feed tube 69 into the respective molds, without engaging the feed tube or any other member on its way from the shear means into the mold. The tube 69 serves therefore not to guide the gob 67, but only to protect the gob against undesired draft and therefore uncontrolled cooling. The end of the feed tube 69 may be arranged at the level as shown in FIG. 1 since the plunger carriers 36 are at 70 offset in rearward direction and therefore in side view of L-shaped configuration.

Since FIG. 1 illustrates the arrangement as viewed by a person who moves with the turntable in the direction of the arrow 33, the actually vertical fall line of the gob 67 during its drop after leaving the feed tube 69, appears in FIG. 1 as part of a parabola. Three such parabola parts 73, 74 and 75 are illustrated in FIG. 1 which respectively corresponds to 30, 40 and 50 revolutions per minute of the turntable.

In order to feed a gob 67 into the mold 56, it is necessary to move the carriage 50 from its normal position in which the axis of the mold carried by the carriage is aligned with the axis 80 of the corresponding operating station into a loading position in which the axis is located at 81. This will result in a movement of the carriage relative to the track means 53, and this relative movement can be made in two different ways as will be explained later on in connection with FIG. 12. In its loading position in which the axis of the mold carried by the carriage 50 is located at 81, the carriage is arrested a short time so that the gob 67 may securely drop into the mold 56. Subsequently thereto, the carriage is again moved relative to the track means 53 until it reaches a normal position in which the axis of the mold 55 on the carriage coincides with the axis 80 of the station.

Figure 8:
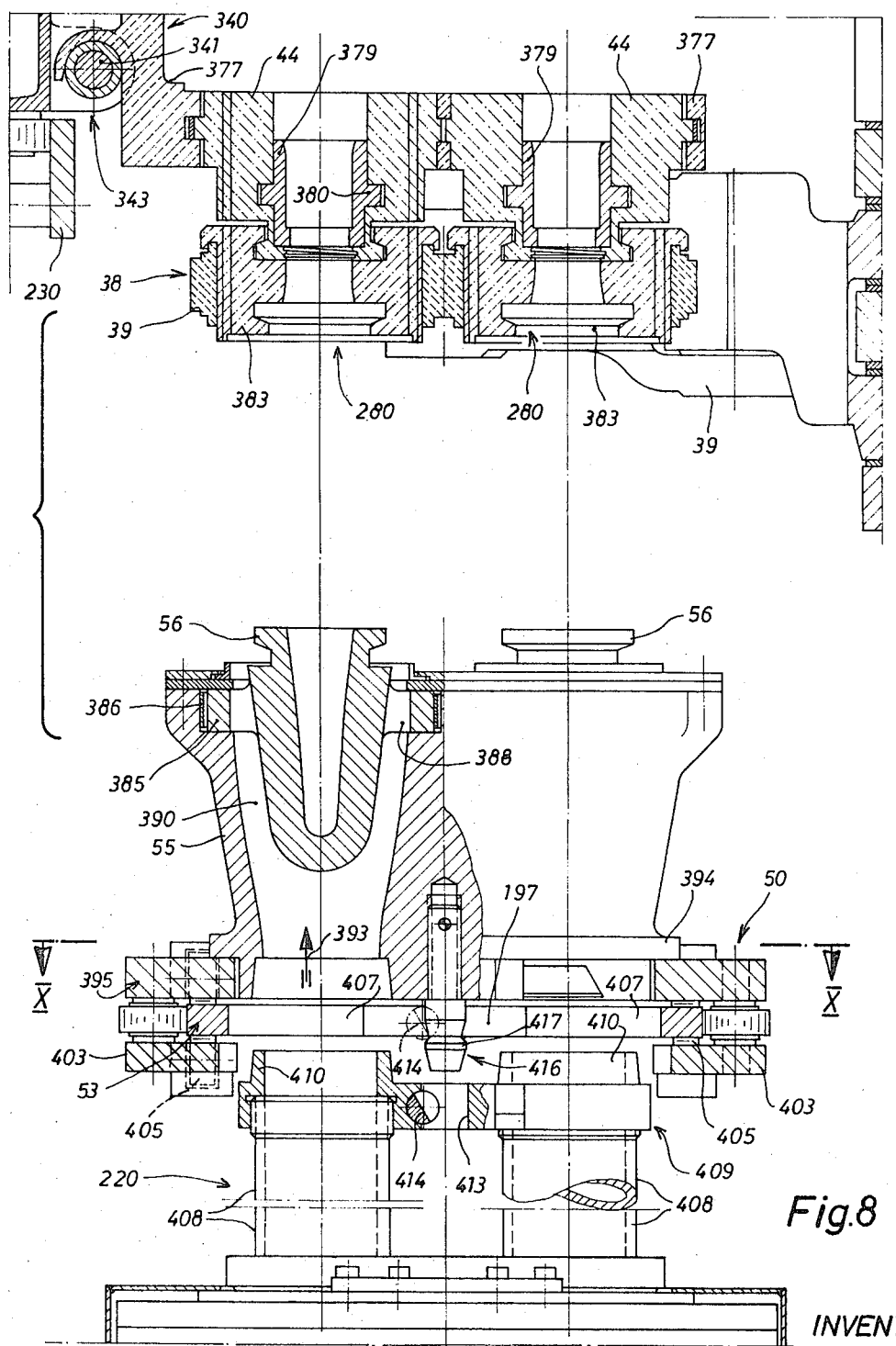
FIG. 8 is a partially sectioned side view of essential elements of one operating station of the machine, drawn to an enlarged scale, in which the cross-section is taken along the line VIII—VIII of FIG. 10.

The machine has to be constructed so that the gob 67 on its way from the end of the feed tube 60 to the mold 56, does not come in contact with any other part of the machine. In the machine illustrated as an example, there is located a sprocket wheel 85 between the feed tube 69 and the molds 56, which wheel engages a chain 87 (FIG. 2) which in turn carries the neck rings 43 on inwardly extending neck ring supports (FIG. 8). The sprocket wheel 85 is between successive operating stations, for instance 30 and 31, provided with cut-outs 89 for the passage of the gobs therethrough. The pitch of the sprocket chain is designated with 90.

Gripper means 38 are arranged beneath the neck rings 43 and the gripper means are shown in full lines in FIG. 1 in closed position and in dash-dotted lines in their fully opened position. If in the fully opened position of the gripper means the danger would exist that the gobs would collide with the same, ghe gripper means is, during passage of the dropping gob, shortly closed to a sufficient degree and then opened again in order to let the gob 67 pass into the mold without coming into contact with the gripper means.

As schematically shown in FIG. 2 the chain 87 transports a plurality of empty neck rings 43 uniformly spaced from each other to the turntable 95 which serves to carry a plurality of press molds 56 arranged spaced from each other along a circle 97, which in the illustrated embodiment is located within the chain 87. The sprocket wheel 85 is, in the region of each of neck rings 43, provided with a V-shaped cut-out 98.

At the point 100 of the circle 97 along which the mold housings 55 are arranged, the axis of the arriving neck ring 43 intersects the aforementioned circle 97.

The diagram shown in FIG. 2 is designed for 50 revolutions per minute of the turntable. Different numbers of revolutions of the turntable or other features of the machine may lead to a different layout of the diagram. The direction of rotation of the turntable 95 is indicated by the arrow 103. While the turntable starting from the point 100 turns through an angle 105, the gripper means 38 will close about the neck ring 43, and the upper portion of the mold 56, which is in the meantime raised from the position as shown in FIG. 1, as will be explained later on in detail.

Figure 12:
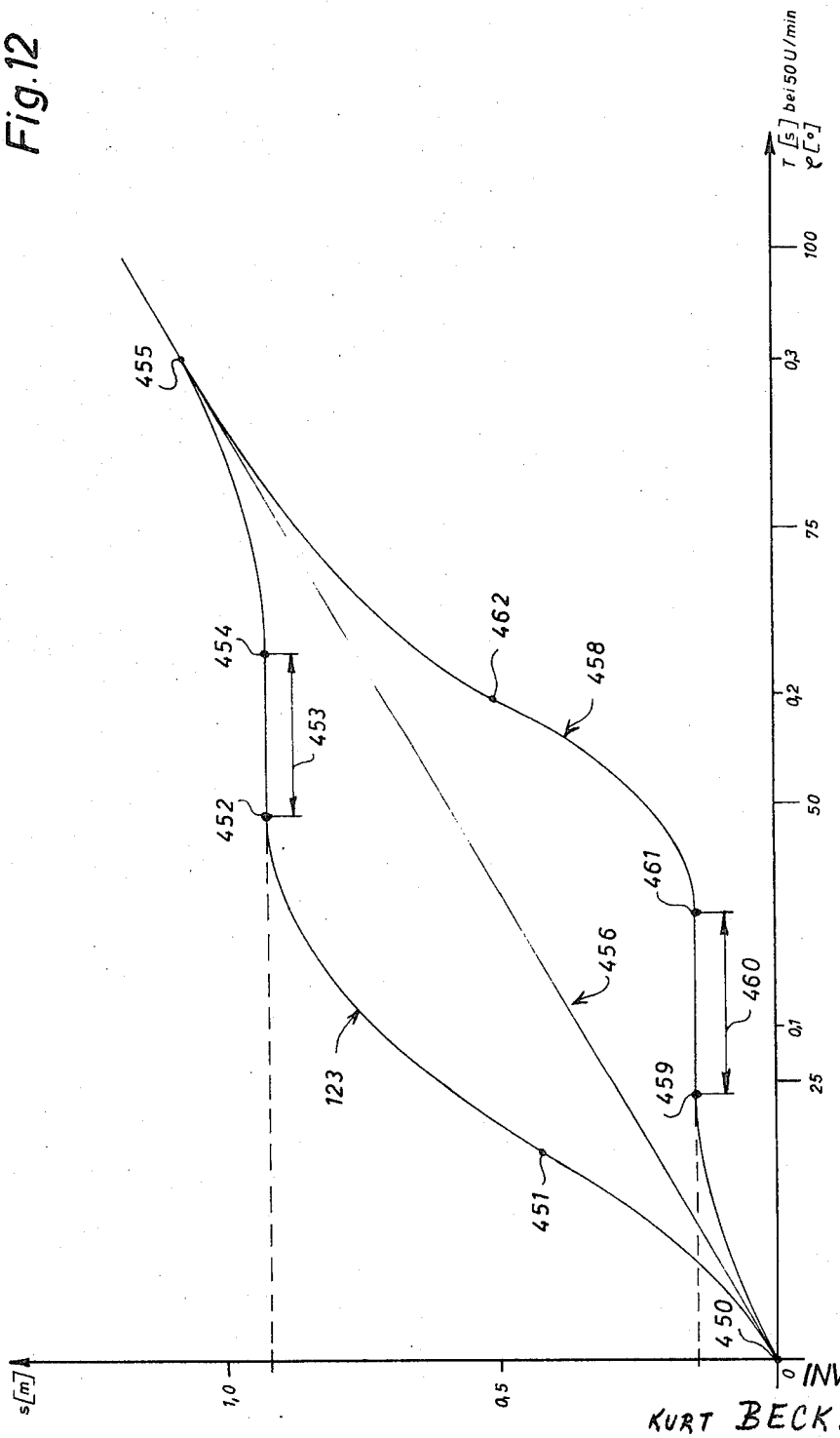
FIG. 12 is a schematic diagram showing the movement of a carriage immediately before, during and after a gob is fed into the mold means carried by the carriage, and in which the carriage is moved with the speed different from the uniform speed.

In the region of the angle 107, the plunger 35 is moved downwardly to its lowest position in the mold 56. In the region of the turning angle 110, the gob fed in the mold is pressed by the plunger 35. During the following turning angle 11, the plunger 35 is raised back again to its starting position as shown in FIG. 1. The gripper means 38 are opened while the turntable turns through the angle 113. During turning of the turntable through the angle 115, the mold with its mold housing 55 is returned to the starting position shown in FIG. 1, so that the parison formed during the press forming of the gob remains suspended on the neck ring 43 and is transported by the chain 87 from the point 117 of the circle 97, in which the molds are arranged, away from the turntable. The thus-formed parison is subsequently thereto further treated in a manner not forming part of the present invention. The mold 56 is checked during turning of the turntable through the angle 120 in order to assure that no material remains in the mold. This checking is necessary in order to protect the machine against malfunction and, if during such checking it is ascertained that some material remains in the mold, the machine is automatically stopped in order to prevent malfunction of the same, and this safety device provided in the machine according to the present invention will be discussed later on in connection with FIG. 22. While the turntable turns through the remaining turning angle a gob 67 is fed into the mold 56. In the example illustrated, the carriage 50 is at this time moved relative to the track 53, which moves with the uniform speed of the turntable, for instance according to the curve 123 as shown in FIG. 12. This movement of the carriage 50 relative to the track is produced by a pneumatic motor 125 (FIG. 3A) in the manner as will be explained later on.

At first, the carriage 50 is accelerated during the turning angle 127 of the turntable relative to the uniformly moved track 153. Subsequently thereto, the pneumatic motor 125 is reversed during the turning angle 128 of the turntable and thereafter decelerates the carriage 50 during the turning angle 129 until the carriage comes to an absolute stop in the loading station at which the axis of the mold is located at 81, as shown in FIG. 1. The mold is retained at standstill while the turntable turns through the angle 130 and this time period is usually used to drop a gob 67 into the mold 56, or to eliminate any malfunction which has been ascertained during the turning of the turntable through the angle 120. During turning of the turntable through the angle 133, the pneumatic motor 125 is again reversed so as to accelerate the mold subsequently thereto while the turntable turns through the angle 135, until the mold is moved again with the same uniform speed as the track 53. The carriage 50 reaches the same speed as the track 53 at the point 136 of this circle 97 and in the remaining turning angle 139, the mold 56 is lifted together with the mold housing 55 in a manner as will be described later on from its lower position shown in FIG. 1 to an upper position in which the upper end of the mold is located in the region of the still-opened gripper means 38.

Figure 3A:
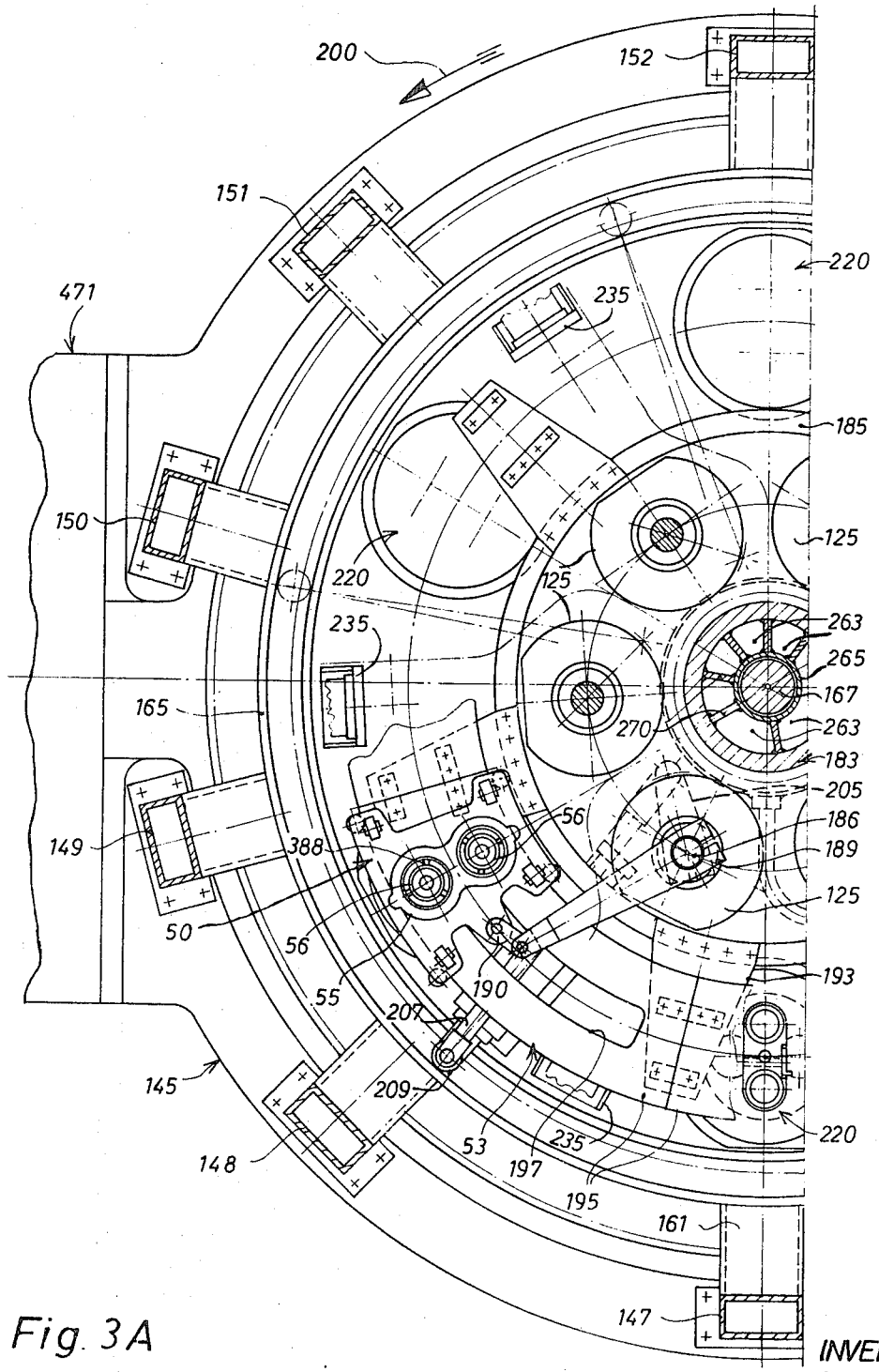
FIGS. 3A and 3B, together, illustrate a cross-section taken substantially along the line III—III shown in FIG. 4.
Figure 3B:
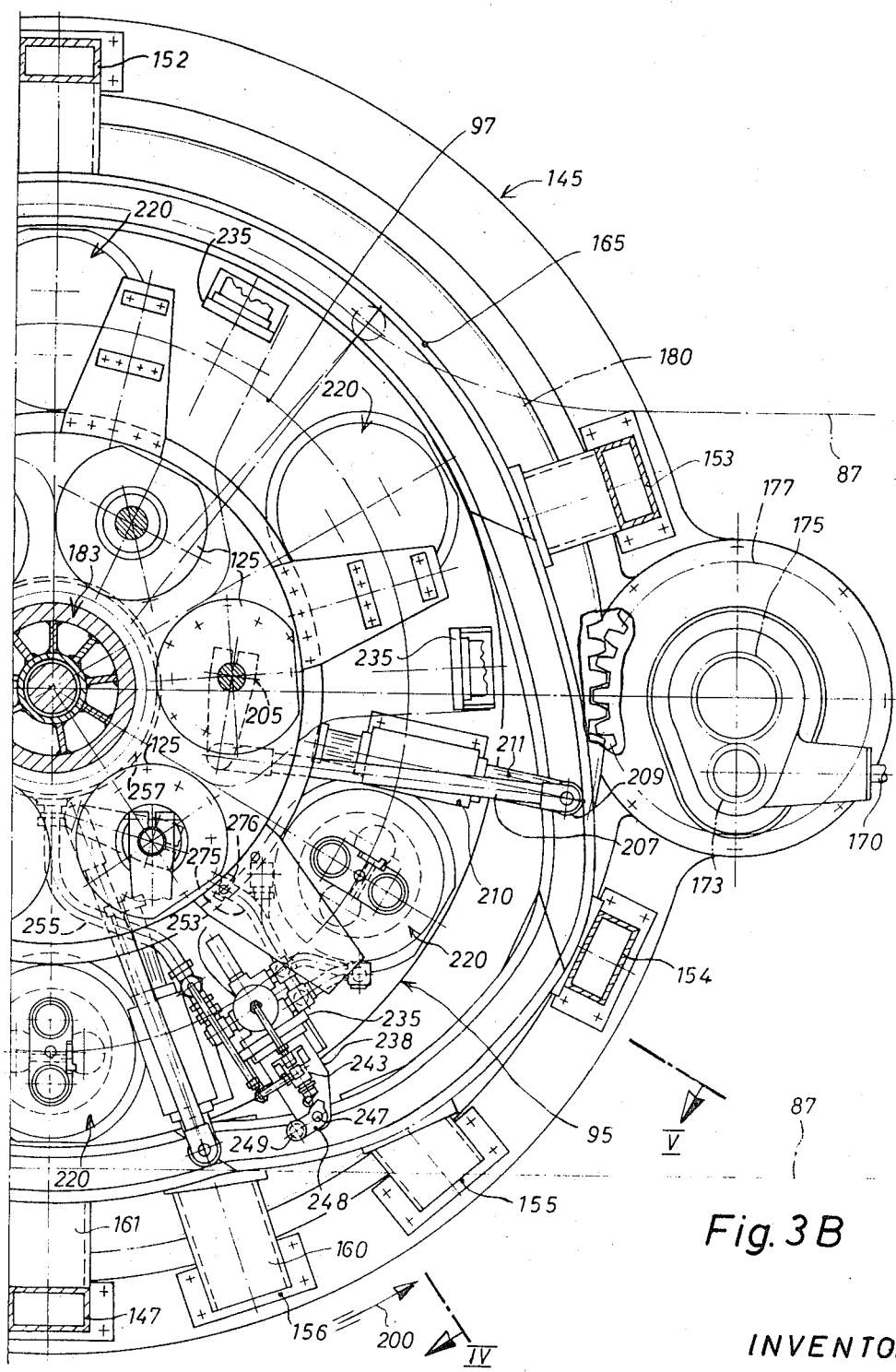
Figure 4:
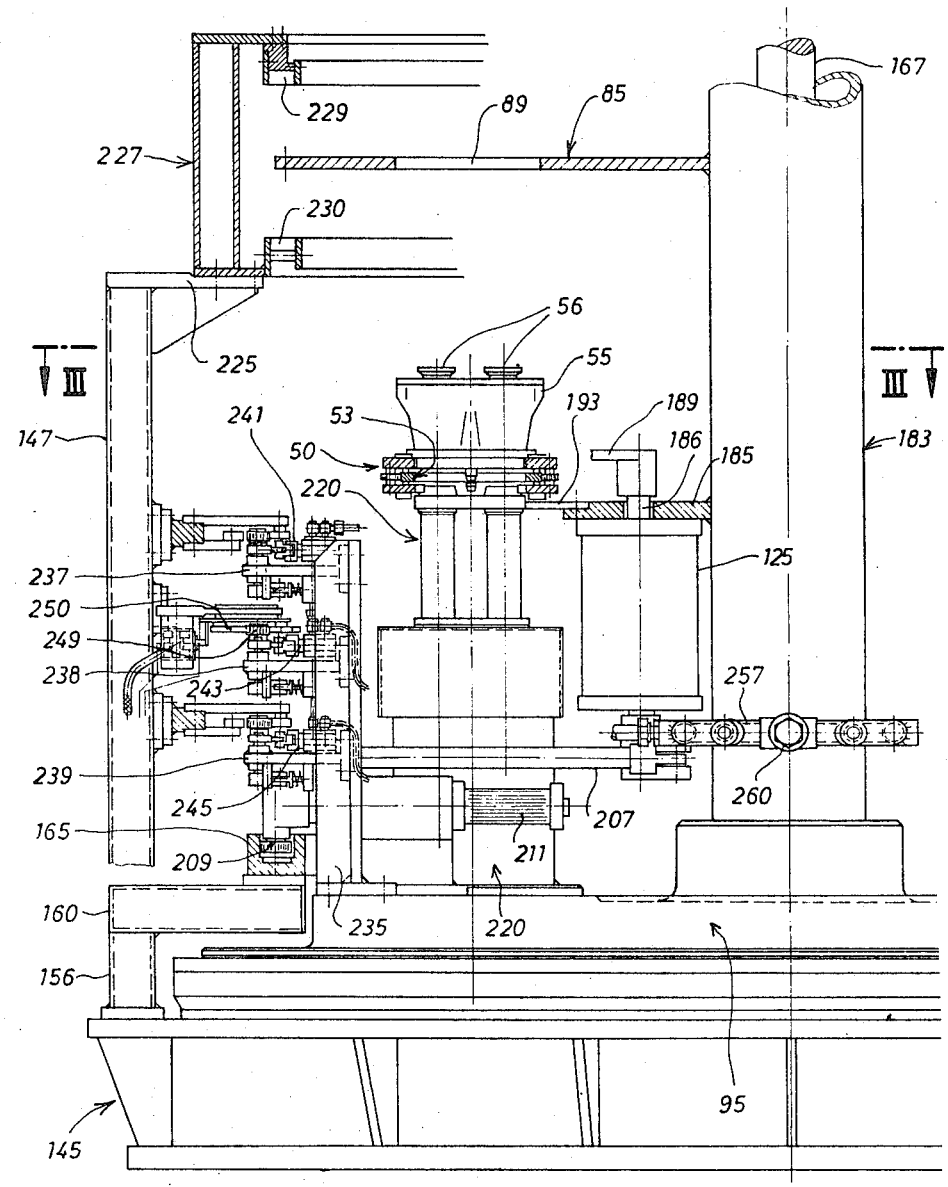
FIG. 4 is a cross-section taken substantially along the radial line IV of FIG. 3B.

Referring now to the following Figures, and more specifically to FIGS. 3A, 3B and 4, it will be seen that the machine, according to the present invention, comprises, as shown in FIGS. 3A and 3B, a stationary base plate 145 with uprights 147–156 connected thereto. To each of the uprights is welded a radially inwardly extending bracket, for instance 160 and 161. The two uprights 155 and 156 are, as shown in FIG. 4 for the upright 156, lower than the other uprights and they carry a corresponding bracket, for instance 160.

To the inner free ends of the brackets, for instance 160 and 161, is a pilot track 165 connected, which cooperates with the pneumatic motors 125 for the drive of the carriage 50 in the manner as will be explained later on.

A turntable 95 is supported on the base plate 145 turntable about a central column 167, as shown in FIG. 4. Six operating stations, as for instance schematically illustrated at 30 and 31 in FIG. 1, are mounted on the turntable 95 uniformly spaced from each other. All of these operating stations are constructed in the same manner so that a description of one of the stations is believed to be sufficient.

The drive of the turntable 95 about its axis is accomplished, as shown in FIG. 3B, from a drive shaft 170 which, over a pair of non-illustrated bevel gears, drives a gear 173. The gear 173 meshes with a gear 175 coaxially fixed on a common shaft with a drive gear 177 and the latter is in meshing engagement with a gear rim 180 provided on the turntable 95. The drive shaft 170 is rotated with uniform speed and this drive shaft is synchronized in a manner known in the art and not illustrated in the drawing with the operation of the glass shear 65 illustrated in FIG. 1.

A hollow shaft 183 is fixedly mounted on the turntable 95 concentric with the column 167 and spaced from the outer surface thereof.

A support ring 185 is fixedly connected to the hollow shaft 183 and the drive shafts 186 of the pneumatic motors 125 extend through appropriate openings of the support ring 185. Each of the drive shafts 186 carries, on its upper free end, a drive arm 189, the free end of which is connected by a link 190 to the respective carriage 50, as shown in FIG. 3A.

The support ring 185 carries also fixed thereto for each of the operating stations, a trapezoidal radially outwardly extending support sheet 193 on which the track 53 is supported by means of non-illustrated spacer members. The distance between the track 53 and the support sheets 193 is necessary due to the special construction of the carriages 50 which overlap in a C-shaped manner the opposite sides of the track 53.

As shown in FIG. 3A, the track 53 is formed from a plurality of sectors 195, one for each operating station. Each sector 195 is provided with a curved longitudinally extending slot 197 and which is continued on its left end, as viewed in FIG. 3A, by a non-illustrated radially extending slot so that a substantially T-shaped slot is formed in each sector. The radially extending part of the slot is arranged in FIG. 3A exactly beneath the two molds 56 in the mold housing 55.

The carriage 50 is shown in FIG. 3A in its normal position in which the carriage is moved with a relative movement to the track 53 with uniform speed, together with the turntable 95 in the direction of the arrow 200. Only during loading of the mold with a gob 67, is the carriage 50 moved from its normal position onto the part of the sector 195 shown at the right side of FIG. 3A. The slot 197 serves during this part of the movement of the carriage to blow cooling air therethrough from below onto the molds 56.

A pilot arm 205 is connected to the other free end of the drive shaft 186 of each pneumatic motor 125, and this pilot arm is connected by means of a connecting rod 207 (see FIG. 3B) to a roller 209 which rolls in a stationary, curved pilot track 165. The roller 209 is in addition guided by a longitudinal guide 210 mounted on the turntable 95, the axially movable rod 211 of which is, against turning about its axis, properly profiled.

The pilot track 165 is circular in the part thereof illustrated in FIG. 3A and also in the part shown in FIG. 3B, which means that in these circular portions of the pilot track, no relative movement between carriage 50 and the carriage track 53 will take place. Such a relative movement is restricted to such parts of the pilot track 165 illustrated in FIG. 3B which deviate from the circular path and which correspond to the turning angles 127–135 in FIG. 2.

Lifting means 220 to raise and lower the mold housing 55 and the two molds 56 mounted therein during turning of the turntable through the angles 115 and 139 shown in FIG. 2, are arranged fixed to the turntable 95 vertically beneath each carriage 50 in its normal position, as shown in FIG. 3A. These lifting means will be further described later on in connection with FIGS. 16–19.

Each of the uprights 147–154 carries at its upper end fixedly connected thereto a bracket, for instance 225, as shown in FIG. 4, on which a support construction 277 for two continuous guide tracks 229 and 230 for the chain 87 are mounted.

FIG. 4 illustrates further an upright post 235 fixedly mounted to the turntable which carries the switch means for the control of the pneumatic circuits of the corresponding operating station of the machine. As shown in FIGS. 3A and 3B, such a post 235 is provided for each of the operating stations.

As shown in FIG. 4, the upright post 235 illustrated therein, carries, for instance three radially outwardly extending tables 237, 238 and 239. The table 237 carries a pneumatic switch 241 for control of the pneumatic circuits for the operation of the plunger 35, the table 238 carries a pneumatic switch 243 for control of the respective pneumatic motor 125 for movement of the respective carriage 50 relative to the turntable, and the table 239 carries a pneumatic switch 245 for control of the pneumatic circuits of the corresponding lifting means 220. Corresponding valves are mounted on the rear side of the post 235 and these valves are omitted from FIG. 4 for reasons of simplicity.

One of the tables 238 with the pneumatic switch 243 mounted thereon, is illustrated in FIG. 3B in a top view. The pneumatic switch 243 has two stable switching positions which are controlled by means of a switch lever 248 turnably mounted at 247 on the table 238 and the actuating roller 249 connected thereto. The actuating roller 249 cooperates with an actuation cam 250 (FIG. 4) which is for instance fixedly connected to the upright 147 in such a manner that each carriage during rotation of the turntable 97, will be driven relative to the turntable by the pneumatic motor 125 when the latter is actuated by the corresponding switch.

The valve 253 which is actuated by the switch 243 is shown in FIG. 3B on the rear side of the post 235. The valve 253 is supplied with compressed air through a conduit 255 which in turn is supplied from a distributor passage 257 connected to the hollow shaft 183. The distributor passage 257 is connected by means of a nipple 260 shown in FIG. 4 through the hollow shaft 183 with one of the eight axial channels 263 provided therein which are formed by the inner surface of the hollow shaft 183, the outer surface of a concentric thereto supported inner hollow shaft 265 arranged spaced from the central column 167, and between the two hollow shafts connected radially extending separating walls 270. The axial channels 263 may be provided with compressed air of different pressures corresponding to the pressure requirements of the pneumatic apparatus connected thereto.

Figure 20:
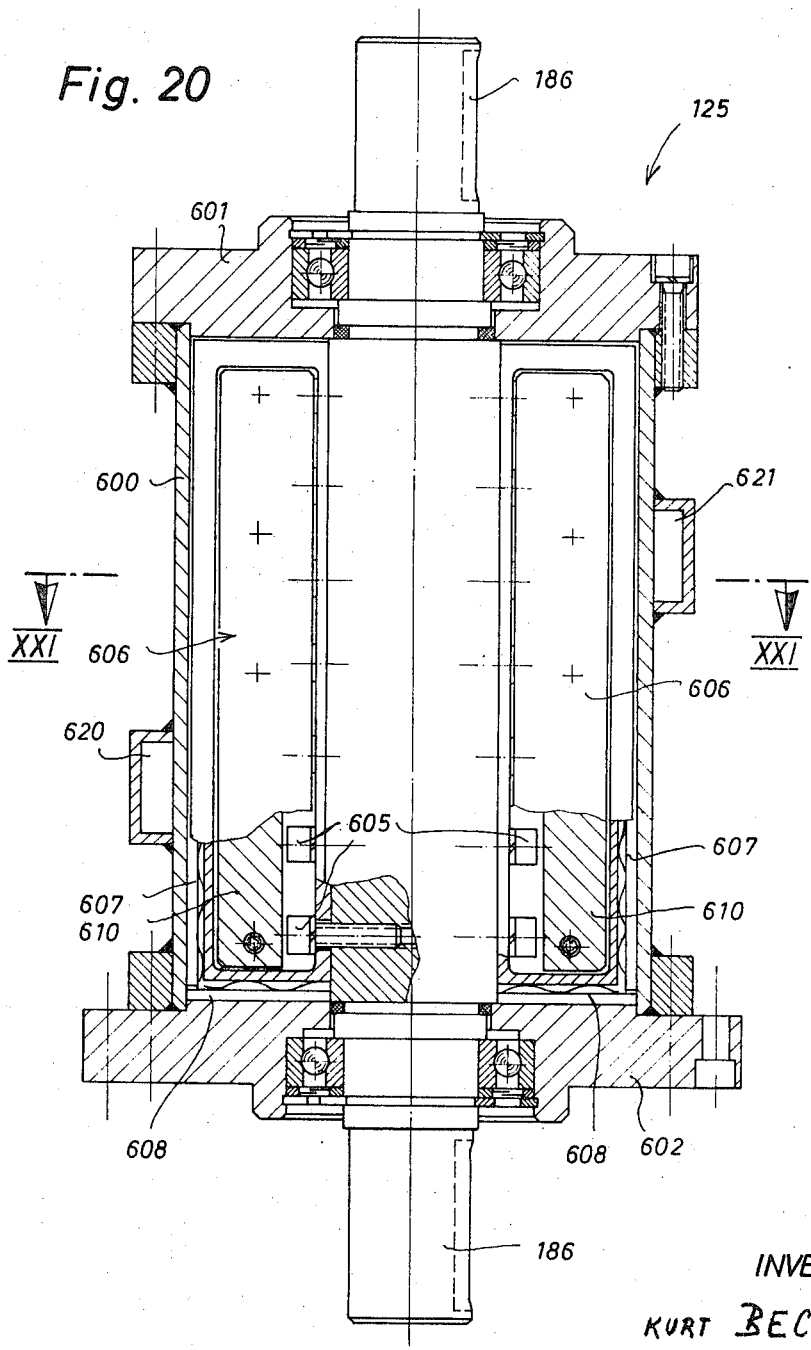
FIG. 20 is a longitudinal section of a pneumatic motor according to the present invention taken along the line XX—XX in FIG. 21.
Figure 21:
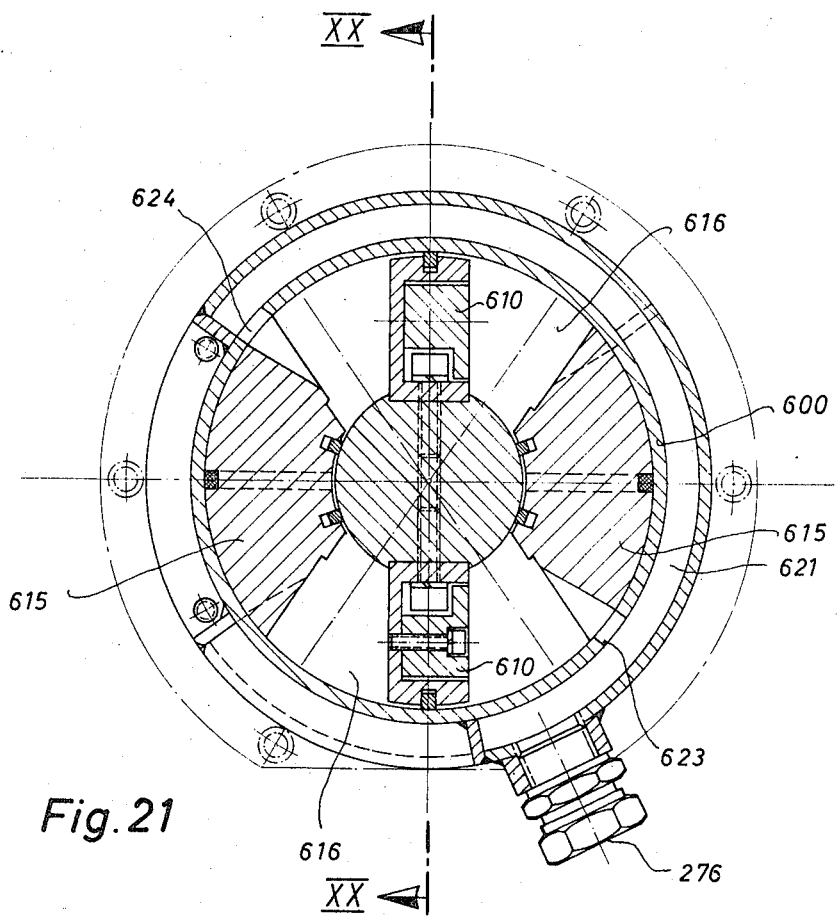
FIG. 21 is a cross-section taken along the line XXI—XXI of FIG. 20.

The compressed air from the valve 253 in FIG. 3B is supplied either over the conduit 275 to the connection 276 of the pneumatic motor 125, or over a similar further conduit, arranged in FIG. 3B beneath the conduit 275 through a connection similar to the connection 276 for the reverse operation of the pneumatic motor 125 (see also FIGS. 20 and 21).

FIG. 5 illustrates a part of the machine located above those parts which are illustrated in FIG. 4. The mold housing 55 is shown in FIG. 5 in a position in which it is raised by the lifting means 220, and in which the molds mounted in the mold housing as well as the neck rings 43 cooperating therewith, are overlapped by a mold middle part 280 suspended in the gripper means 38 and connecting the molds 56 and the corresponding neck rings 43, to a combined mold form when the grippers 38 are closed.

Each of the gripper means 38 is driven by a pneumatic motor 283 which is mounted in a hub 285 which in turn is connected by an annular tension spring arrangement 286 in a fixed position to the outer surface of the hollow shaft 183. The pneumatic motor 283 drives with the lower end of its drive shaft the linkage 288 for the operation of the gripper means 38. A pilot arm 290 fixed to the upper end of the drive shaft of the motor 283 carries a roller 291 which in turn cooperates with a stationarily mounted curved pilot track 293. The curved pilot track 293 is connected by means of a plate 295 to an outer tube 297 arranged concentrically with the hollow shaft 183, and the outer tube 297 is, as shown in FIG. 7, connected to the central column 167, while being prevented from turning about its axis.

The plunger support 36 shown in FIG. 5 is of substantially L-shaped configuration and the vertical leg 300 thereof is provided with a plurality of guide rails 301 which cooperate with the rollers 302 of a guide housing 305 connected to the hub 285. The plunger support 36 is therefore mounted movable in vertical direction and is driven by a pneumatic motor 307 which in turn is mounted on an arm 308 of the guide housing 305.

A pinion 311 and a crank 313 are fixed to the drive shaft 310 of the pneumatic motor 307 as shown in FIG. 6. The crank 313 is connected by means of a connecting rod 315 to a trunnion on the head 317 of the plunger carrier 36. The crank pin 319 is shown in FIG. 5 in full lines in its upper dead-center position and in dash-dotted lines in its lower dead-center position.

The pinion 311 meshes, as shown in FIG. 6, with a rack 321 which at its upper end carries a roller 323. The roller 323 is normally guided on a stationary cam track 330 which is mounted on a plate fixed to the outer tube 297. The cam track 330 is provided with at least two raised cam portions 335 which serve to move the plunger carrier 36 positively in upward direction even if supply of compressed air to the pneumatic motor 307 should be interrupted for some reason. This forced raising of the plunger carrier 36 is especially necessary in the region of the points 100 and 117 shown in FIG. 2 in which the chain 87 is respectively guided in and out of the region of the turntable 95 and in which a collision between the plunger 35 and the neck rings would occur if the plunger would not be raised in upward direction.

As mentioned above, the two-part split neck rings 43 are each mounted in a likewise two-part neck ring holder 340 which, as shown in FIG. 5, is in side view of L-shaped configuration. The two-part neck ring holders 340 are mounted for movement relative to each other and in direction normal to the plane of the drawing sheet on a pair of rods 341. The rods 341 form part of a transport carriage 343 which in turn forms a link of the chain 87 which is driven by the sprocket wheel 85 and guided in the guide tracks 229 and 230.

FIG. 7 illustrates the part of the machine according to the present invention extending upwardly from those parts which are formed in FIG. 5 at an enlarged scale. The inner hollow shaft 265 and the outer hollow shaft 183 are connected by a ring 350 at the uppe ends to each other and the ring 350 is mounted by means of a roller bearing 351 on the central column 167. The outer tube 297 is suspended on a head member 353 which is mounted on the upper end of the central column 167 and connected to the column by a set of annular clamping springs 355 in fixed position.

Eight rings 357 are connected to the outer tube 297 by screws 358 axially spaced from each other and each of the rings carries at the inner surface thereof an annular sealing member 360 which engages the outer surface of the hollow shaft 183. In this way, seven annular chambers 361 are provided between the outer hollow shaft 183 and the outer tube 297, and each of these annular chambers 361 is connected by a connection 363 with a pressure reducing valve 365. Only one of these valves is shown for simplification reasons in FIG. 7, but it is to be understood that one such valve is provided for each of the annular chambers. Each pressure reducing valve 365 is connected by a conduit 367 with an air pressure manifold 370 which is mounted on the head 353, and which receives compressed air from a conduit 371. Each pressure reducing valve 365 is further connected by a conduit 373 in a manner not illustrated in the drawing with a pressure control device in the control desk of the machine, not shown in the drawing, so that the desired pressure at the outlet end of the respective pressure reducing valve 365 may be preadjusted by remote control. Each of the annular chambers 361 is further connected by a connecting bore 375 with a respective one of the axial channels 263.

FIG. 8 illustrates in the upper part thereof one half of a neck ring support 377 in which two halves 44 of a neck ring are suspended. A head ring 379 is suspended in each two complementary neck ring halves 44 and 45 (FIG. 1), and this head ring is prevented from falling out of the two halves of the neck ring since the two halves of the neck ring holder 340 can only move a small distance away from each other when the finished article is to be removed from the neck ring. Each of the head rings 379 is provided with a radially outwardly extending flange 380 which is mounted in a corresponding groove in the neck ring halves.

Two intermediate mold parts 383 are suspended from gripper halves 39 which during closing of the gripper means 38 overlap with an upper portion thereof the lower portion of the neck ring 44, 45 and with a lower portion thereof the upper portion of the molds 56 when the latter are brought to the raised position thereof. For reasons of clarity, however, the molds 56 are shown in FIG. 8 still in their lower position on the carriage 50. In the position illustrated in FIG. 8 each of the molds 56 is suspended by means of a mold supporting ring 385 in the corresponding mold housing 55, and each ring is mounted by means of a corrugated annular spring 386 slightly radially floating in the mold housing 55. The mold supporting ring 385 is connected to the respective mold 56 by three webs 388, which are also shown in top view in FIG. 3A. In this way, a passage 390 is formed about the mold 56 and this passage extends axially also through the mold housing 55 so that cooling air may be passed therethrough in direction of the arrow 393.

The mold housing 55 is by means of an annular flange 394 mounted on a plate 395 of the carriage 50. The plate 395 is, as shown in FIG. 10, on each of its four corners provided with a cut-out 397 in each of which a roller 398 is mounted, which are respectively in engagement with the track 53. The plate 395 carries also on each of its four corners, a guide roller 400 turntable about a vertical axis, and these guide rollers are respectively in engagement with the lateral surfaces of the track 53.

Spacer bolts 401 connected to the plate 395 carry at the lower ends thereof two elongated plate-shaped members 403 (FIG. 8) which in turn carry rollers 405 which cooperate with the bottom face of the track 53. In this way, each of the carriages 50 is properly guided in the lateral as well as in vertical direction.

FIG. 8 also shows the longitudinal slot 197 formed in the track 53 as well as the two portions of the radial slot 407 respectively located to opposite sides of the slot 197.

The lifting means 220, partially shown in the lower part of FIG. 8, comprise two parallel lifting tubes 408 which at the upper ends thereof are connected by a bridge 409 provided with connecting nozzles 410 which in the raised position of the lifting means engage with and form a continuation of the passages 390 in mold housing 55. The bridge 409 is provided with a central bore 413 into which normally, that is in the position shown in FIG. 8, a portion of a locking rod 414 extends which is turnably mounted in the bridge, and which during raising of the bridge by the lifting means 220 and corresponding entering of a locking pin 416 connected to the mold housing 55, yields elastically and engages with an annular groove 417 in the locking pin 416. The locking position of the rod 414 is shown in FIG. 8 in dash-dotted lines.

Figure 11:
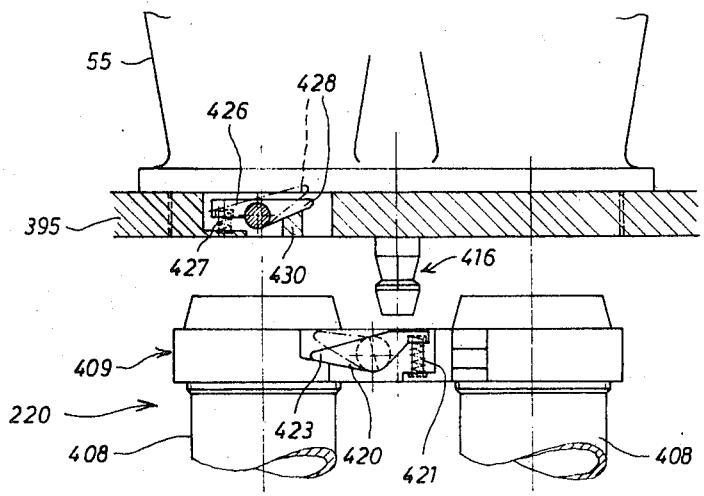
FIG. 11 is a partially sectioned side view taken along the line XI—XI in FIG. 10.

As shown in FIGS. 10 and 11, the locking rod 414 is provided at one of the ends thereof with a double-armed lever 420, one arm of which acts through a compression spring 421 onto the bridge 409, whereas the other arm carries at its free end an outwardly extending projection 423. A two-arm unlocking lever 426 is tiltably mounted by means of a shaft 425 in the carriage plate 395, and one arm thereof, acts through a compression spring 427 onto the plate 395, whereas the other arm thereof normally engages a rib 430 on the carriage plate 395 and cooperates with its free end 428 with the projection 423.

When the two lifting tubes 408 together with the bridge 409 are lifted beyond the position shown in FIG. 11, the locking pin 416 turns the double-armed lever 420 first in clockwise direction until the locking rod 414 engages into the annular groove 417 in the pin 416. This turned position of the lever 420 is shown in dash-dotted lines in FIG. 11. In the locked position the lever 420 returns again to the position shown in full lines in FIG. 11. During further raising of the bridge 409 through the corresponding opening in the plate 395, the projection 423 of the lever 420 abuts from beneath the free end 428 of the lever 426 and turns the latter in counterclockwise direction to the position indicated in dash-dotted lines in FIG. 11 in which the lever 426 permits the projection 423 to pass in upward direction. Subsequently thereto the lever 426 abuts again against rib 430. When thereafter the bridge 490 is again moved in downward direction the projection 423 engages the end 428 of the unlocking lever 426, which end however cannot yield in downward direction. This will result in a turning of the lever 420 in clockwise direction, and in turn will result in a release of the locking pin 416 so that when the mold housing 55 is again supported on the plate 395 of the carriage, the interlocking between the mold housing and the lifting means 220 is automatically released.

The coupling device between the carriage 50 and the mold housing 55 comprises two coupling pins 435 and 436 which are mounted in the carriage plate 395 respectively on opposite sides of the mold housing, and which are constructed in the same manner. Each of the coupling pins 435 and 436 is in the region of the mold housing 55 provided with a coupling portion 439 which in the coupling position shown in FIG. 9, engages an undercut 440 of the mold housing 55 and which is retained in this coupling position by a spiral spring 443 which is connected to the outer end of each coupling pin.

The inner end of each of the coupling pins 435 and 436 carries a release arm 445 which, in the position shown in FIG. 9, normally projects downwardly beyond the contour of the carriage plate 395. EAch release arm 445 engages during raising of the lifting means 220 a control surface on the bridge 409 and is thereby turned. This moves the coupling portion 439 out of the undercut 440 which in turn causes a decoupling of the mold housing 55 from the carriage 50. The coupling is automatically restored as soon as the mold housing 55 is lowered by means of the lifting device 220 again onto the plate 395 of the carriage.

FIG. 10 shows also that the carriage plate 395 is provided with an eye 448 to which the link 190 shown in FIG. 3A is connected.

In the diagram shown in FIG. 12, the time in seconds, and the corresponding turning angles of the turntable 95, when the latter is turned with 50 revolutions per minute, are shown in degrees on the abscissa, whereas the distance in meters which the carriage 50 moves during the loading of the mold is shown on the ordinate.

The zero point 450 of the diagram corresponds to the start of the turning angle 127 in FIG. 1. From this point on, the carriage is, according to the curve 123, first accelerated up to the point 451 and then decelerated up to the point 452 which also indicates the start of the period 453 in which the carriage 50 is maintained at standstill, and this stationary period of the carriage is terminated at the point 454 of the curve 123. During the period 453 in which the carriage 50 is maintained at standstill, the gob 67 is fed into the mold 56. From the point 454 the carriage is again accelerated up to the point 455 which is located on the straight line 456 through the point 450. This straight line 456 indicates the uniform speed of any point on the circle 97 of the turntable 95 which rotates with uniform speed about its axis.

As mentioned before, the acceleration and deceleration of the carriage 50 and its relative movement with regard to the turntable 95, may be carried out also in a different manner, which is indicated by the curve 458 in FIG. 12. As indicated by this curve, the carriage is first decelerated from the point 450 up to the point 459, then maintained stationarily during the period 460 up to the point 461, from wherein on the carriage is first accelerated up to point 462 and subsequently thereto again decelerated up to the point 455 located, as mentioned before, on the straight line 456, so that the carriage at the point 455 again reaches the same speed at which a point on the circle 97 on the turntable rotates about its axis.

Figure 13:
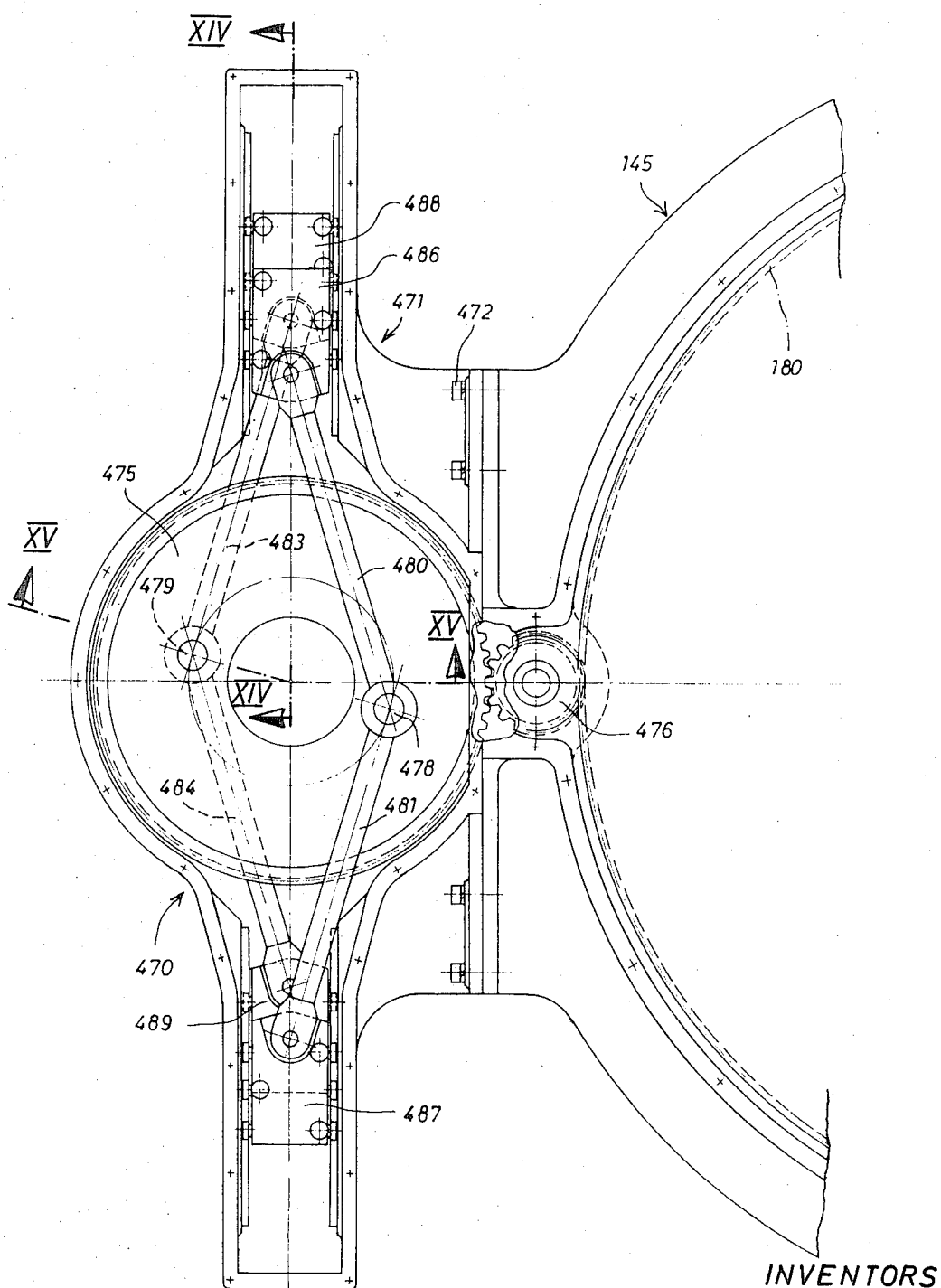
FIG. 13 is a top view of compensating means according to the present invention as viewed in the direction of the arrows XIII—XIII in FIG. 15.

FIGS. 13–15 illustrate compensating means for compensating the inertia forces and inertia moments during operation of the machine according to the invention. The compensating means 470 are provided with a housing 471 which is connected by screws 472 to the base plate 145. A gear 475 is turnably mounted in the housing 471 and the gear 475 meshes with a pinion 476 which in turn meshes with the gear rim 180 of the turntable 95. A pair of diametrically opposite pins 478 and 479 which respectively project in opposite direction are connected to the gear 475 and two connecting rods 480, 481 and 483, 484 are respectively connected to the aforementioned two pins. The outer ends of the connecting rods are respectively connected to weights 486–489 which are mounted for movement in longitudinal direction and guided by means of rollers in diametrically opposite guide ways of the housing 471.

FIG. 14 illustrates the mounting of the gear 471 in a ball bearing 491. As can be further seen from FIG. 14, the counterweights, for instance the counterweights 486 and 488 are arranged to one side of the gear 471 in two planes above each other. The housing 471 is shown in FIG. 14 to be closed by a cover 493.

FIG. 15 illustrates the guiding and supporting of the counterweights 486 and 488 as well as the mounting of the eyes of the connecting rods 483 and 484 in roller bearings 496.

Figure 16:
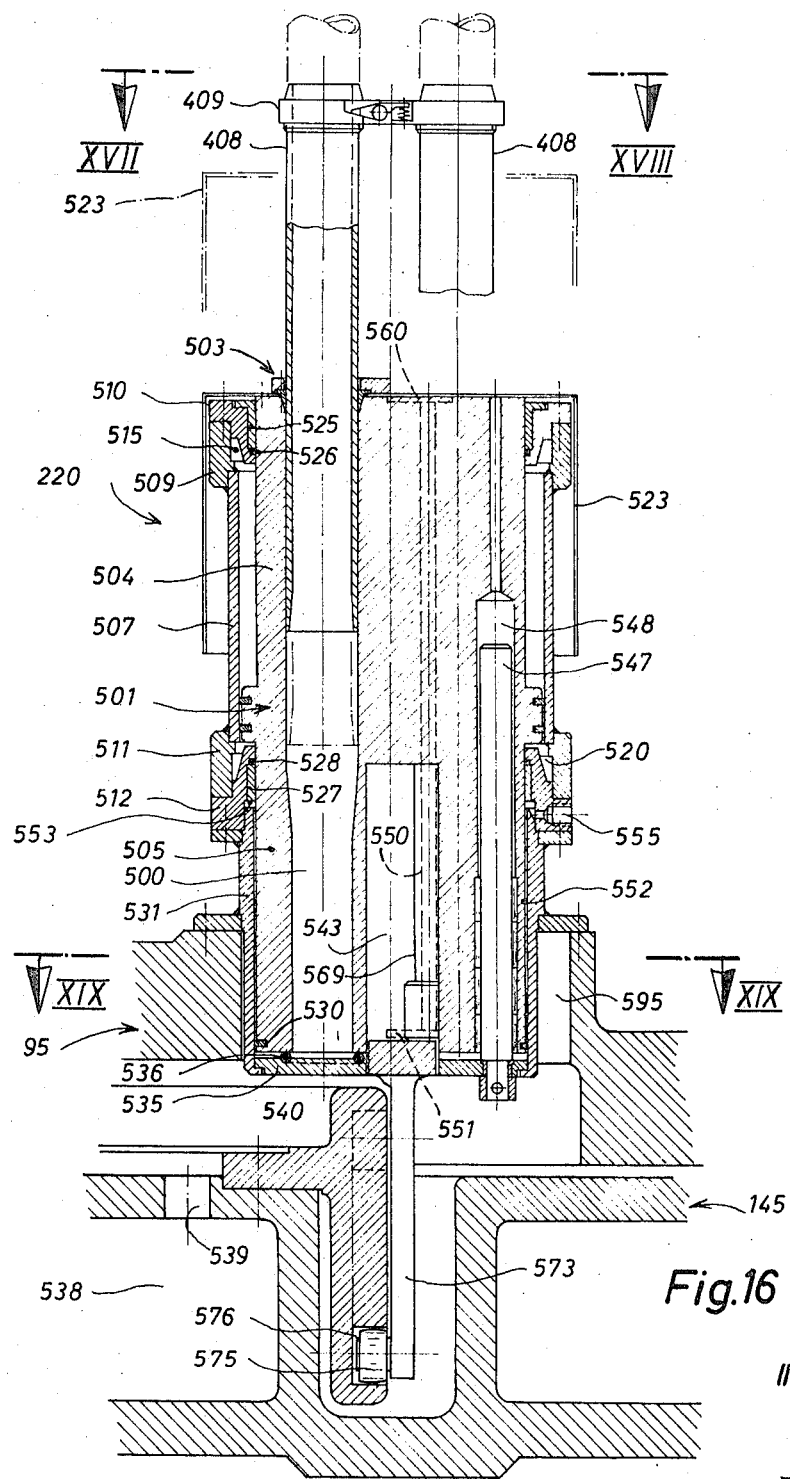
FIG. 16 is a longitudinal cross-section through the lifting means according to the present invention taken along the line XVI—XVI of FIG. 19.
Figure 17:
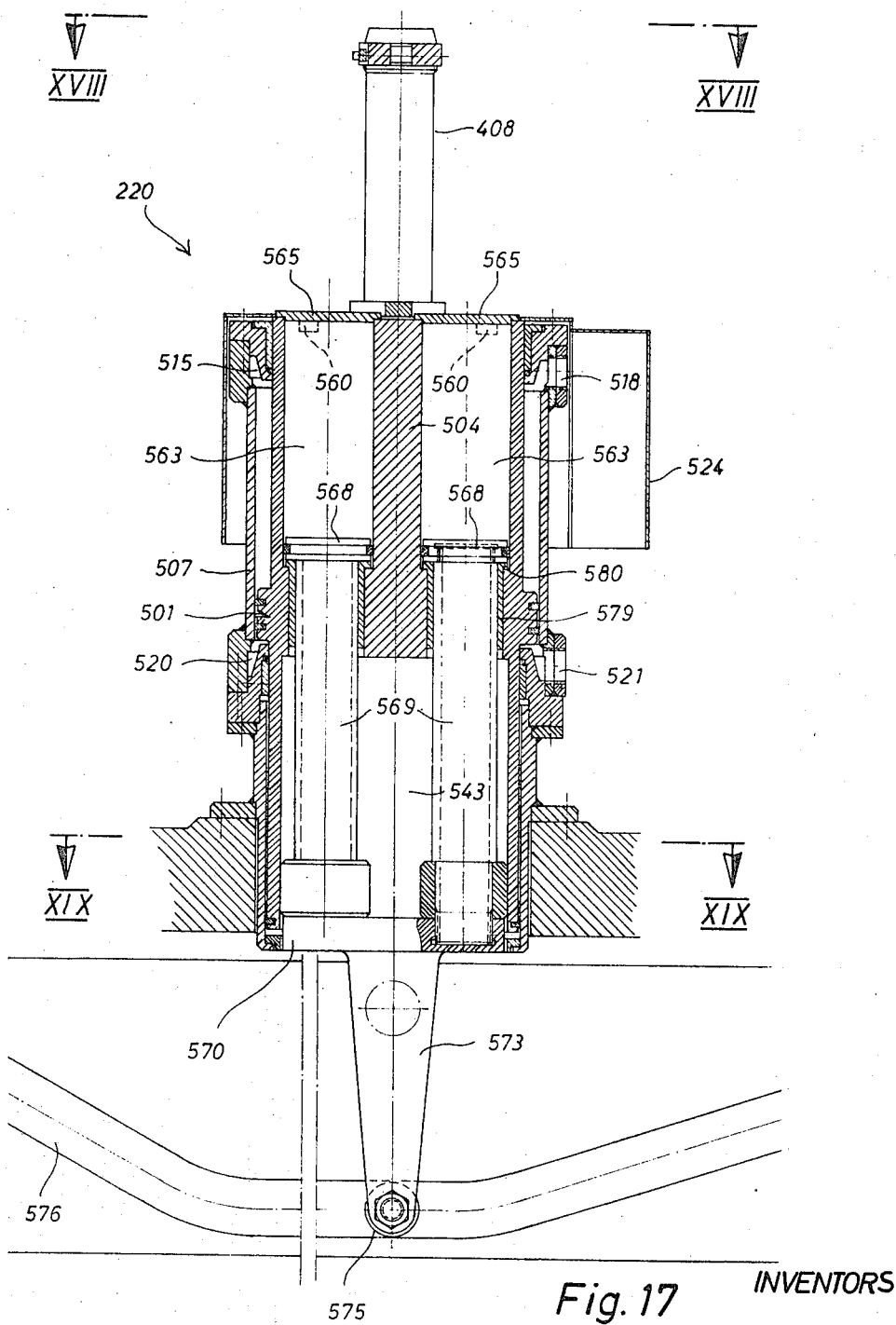
FIG. 17 is a longitudinal cross-section through the lifting means taken along the line XVII—XVII of FIG. 18.

FIGS. 16–19 illustrate the lifting means 220 in further detail. As shown therein, the lifting tubes 408 are mounted at the lower portions thereof in bores 500 of a lifting piston 501 and the piston rods thereof and the tubes 408 are adjustably fixed in the bores 500 by a clamping device 503. A possible lower position of the left lifting tube 408 is indicated in dash-dotted lines in FIG. 16. The bores 500 extend also in axial direction through the piston rods 504 and 505 which project in opposite directions from the lifting piston 501. The lifting piston 501 is axially guided in a lifting cylinder 507 which, at its upper end, is connected to two rings 509 and 5110, and at its lower end, is connected to two rings 511 and 512. The upper rings 509 and 510 define an annular channel 515 which, as shown in FIG. 17, may be supplied with compressed air through connecting socket 518. In the same manner, the lower rings 511 and 512 define an annular channel 520 which, through a connecting socket 521, may be supplied with compressed air. The upper end of the piston rod 504 carries a protecting hood 523, which, in the region of the connecting socket 518 and the non-illustrated compressed air conduit connected thereto, is provided with a radial extension 524. The hood 523 protects the lifting means 220 from any glass which may accidentally drop down.

In the region of the upper ring 510, the piston rod 504 is guided in a bushing 525 and sealed by means of an annular seal 526. The piston rod 505 is, in a similar manner, guided in the region of the lowest ring 512 by means of a bushing 527 and sealed by means of an annular seal 528. The lower end of the piston rod 505 is further sealed by means of an annular seal 530 against an outer coupling cylinder 531 which is connected to the lowest ring 512 and mounted in an appropriate opening of the turntable 95.

The coupling cylinder 531 is provided with a partially open bottom wall 535 which carries, coaxial with the bores 500 through the piston rod 505, annular sealing rings 536, which in the lowest position of the piston 505 shown in FIG. 16 respectively seal the bores 500 against the bottom wall 535, so that no cooling air may pass any longer in upward direction through the bores 500.

The cooling air is supplied through a channel 538 in the base plate 145 of the machine and passes from there through bores 539 into a space 540 beneath the turntable 95 and from the space 540 through openings in the bottom wall 535 into a hollow space 543 provided in the power piston rod 505.

Figure 18:
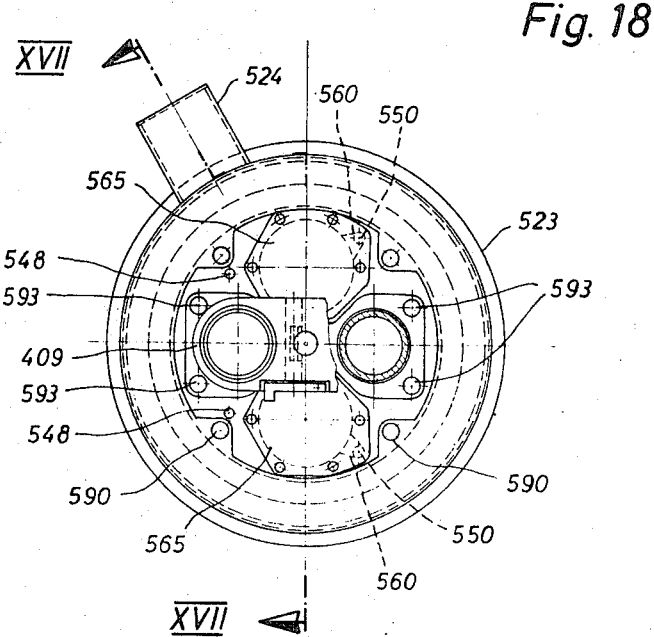
FIG. 18 is a partially sectioned top view of the lifting means viewed in the direction of the arrows SVIII—SVIII in FIGS. 16 and 17.

A pair of guide rods 547 are further connected the bottom wall 535 projecting upwardly therefrom into bores 548 provided in the piston rods and extending in axial direction through the whole length of the piston rods 505 and 504, these bores open at the upper ends thereof, as shown in FIGS. 16 and 18, into the atmosphere.

As further shown in FIG. 16, two further air passages 550 extend from the upper surface of the upper piston rod 504 nearly to the lower end of the lowerpiston rod 505 and communicate there through a cut-out 551 with a clearance space 552 between the outer surface of the piston rod 505 and the inner surface of coupling cylinder 531. Clearance space 552 communicates with an annular channel 553 above the coupling cylinder 531, which in turn communicates with the connecting socket 555. The connecting socket 555 may be selectively connected to a supply of compressed air, or to the outer atmosphere. The upper ends of air passages 550 communicate through cut-outs 560 provided at the upper end of the piston rod 504, as also shown in FIG. 17, with the interior of the coupling cylinders 563 formed in the upper piston rod 504 and respectively closed by a cover 565. The two coupling pistons 568, which are respectively reciprocatably arranged in the cylinders 563, are provided with tubular coupling piston rods 569, the lower ends of which are screwed into correspondingly threaded bores of a cross head 570, which carries a downwardly extending leg 573, which in turn carries at its lower end a roller 575. The roller 575 is guided in a pilot curve track 576 which as shown in FIG. 16 is connected to the base plate 145.

In the region of the lifting piston 501, each of the coupling piston rods 569 is guided in a bushing 579, which with its upper end engages, in the position shown in FIG. 17, the respective coupling piston 568 and forms therefor a stop 580 for the upward movement of the lifting piston 501.

If the connecting socket 55 is connected to the outer atmosphere, the coupling pistons 568 may oscillate within the coupling cylinders 563 without taking the lifting piston 501 and the lifting tubes 408 along, if at the same time no compressed air is fed to the connecting socket 521 of the lifting cylidner 507. By means of this coupling arrangement, it is therefore possible to prevent oscillation of the liftinb tubes 408, even though the leg 573 is continuously oscillated due to its guiding in the pilot track 576.

On the other hand, if the connecting socket 55 is connected to a supply of compressed air, the pressure building up in the coupling cylinder 563 will result to form a rigid unit of the coupling piston 568 and the lifting piston 501 so that lifting piston 501 and the roller 575 on the leg 573 will oscillate simultaneously. However, the acutal drive of the lifting piston 501 is carried out by supplying pressure fluid alternatingly to the connecting sockets 521 and 518.

FIG. 16 shows the protecting hood 523 in its upper dead-center position in dash-dotted lines to indicate the maximum upward stroke of the lifting means 220.

FIG. 18 shows four screws 590 by means of which the protecting hood 523 is fastened to the piston rod 504 of the lifting cylinder 501. This FIGURE shows also the screws 593 for tightening of the clamping device 503.

Figure 19:
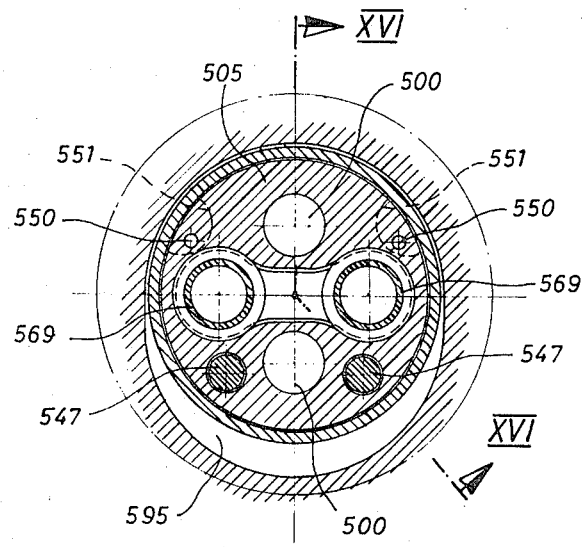
FIG. 19 is a cross-section taken along the line XIX—XIX in FIGS. 16 and 17.

FIG. 19 shows also a sickle-shaped cut-out 595 serving to mount the coupling cylinder 531 in the turntable 95.

FIG. 20 illustrates one of the drive motors 125 for driving each of the carriages in further detail. As shown in FIG. 20, the pneumatic motor 125 comprises a cylinder 600 and two bearing covers 601, 602 mounted on opposite ends of the cylinder for supporting the drive shaft 186 thereof. A pair of vanes 606 are connected by screws 605 to the shaft 186 within the cylinder 600 and each of the vanes is provided with an axially extending and two radially extending bottom sealing strips 608 (only the lower ones being shown). Each of the vanes is of substantially C-shaped configuration, as best shown in FIG. 21, and the space within this C-shaped vane is filled by an aluminum bar 610. As further shown in FIG. 21, two bars of sector-shaped cross-section 615 are fixedly connected diametrically opposite each other to the cylinder 600 and these bars define two working chambers 616 in which vanes 606 can oscillate. Two axially spaced air channels 620 and 621 extend respectively through two-thirds of the circumference of cylinder 600, and each is in communication with a respective working chamber by means of two diametrically opposite passages, as for instance shown for the air channel 621 in FIG. 21 in which these passages are designated with 623 and 624, and it is to be understood that the non-illustrated passages of the air channel 620 are connected in a similar manner with the portions of the working chambers 616 which are located at the rear side of the vanes 606. Each of the air channels is supplied with compressed air through a connecting socket 276 only one of which is shown in FIG. 21 (see also FIG. 3B).

Figure 22:
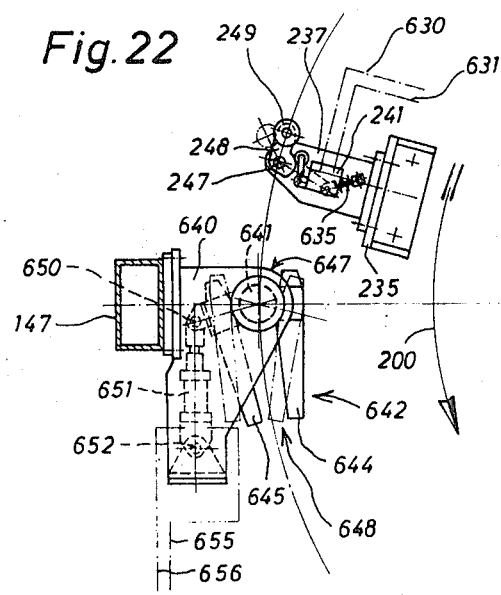
FIG. 22 is a top view of a switch means according to the present invention for controlling the pneumatic motor and showing also the shunt for operation of the switch means.

FIG. 22 illustrates one of the switching arrangements which have already been mentioned in connection with FIG. 4. The same switching arrangement as shown in FIG. 22 can be used with the table 237 and with the table 239. FIG. 22 illustrates the switching arrangement for table 237. This table 237 carries a switch lever 248 turnable on a pin 347 mounted on the end of lever 248. The pneumatic switch 241, together with its two pneumatic conduits 630 and 631, is turnably mounted on table 237 and is held in two of its switching positions in a stable manner by a spring-biased link 635 connected thereto.

The upright 147 carries a bracket 640 beneath which a shunt 642 with two tongues 644 and 645 is turnably mounted on a trunnion 641. The tongues 644 and 645 are held in a fixed position relative to each other and defining a relatively wide inlet passage 647 and a relatively small outlet passage 648 through which the roller 249 may pass during turning of the turntable relative to the stationary shunt.

The piston rod 650 of a piston reciprocable in a cylinder 651 is pivotably connected to the tongue 645 at a point laterally thereof, whereas the cylinder 651 is at its end distant from the protruding piston rod turnably mounted at 652 on the bracket 640. By feeding pressure fluid through one of the control conduits 655 and 656 into the interior of the cylinder 651, the shunt 642 may be turned from the position shown in full lines in FIG. 22 to the position shown in dash-dotted lines. By shifting the position of the shunt 642, the pneumatic switch 241 may be brought to either of its two stable switching positions when the roller 249 passes during turning of the turntable, in the direction of the arrow 200 through the passage defined by the two tongues of the shunt.

With the switching arrangement as shown in FIG. 22, it is therefore possible to control the movement of the plunger 35 in one of the operating stations of the turntable 95.

A similar switching arrangement mounted on the table 239 serves to control passage of compressed air through the connecting socket 55 shown in FIG. 16, and therewith the lifting movement of the lifting tubes 408 which in turn control the lifting movement of the molds 56.

Figure 23:
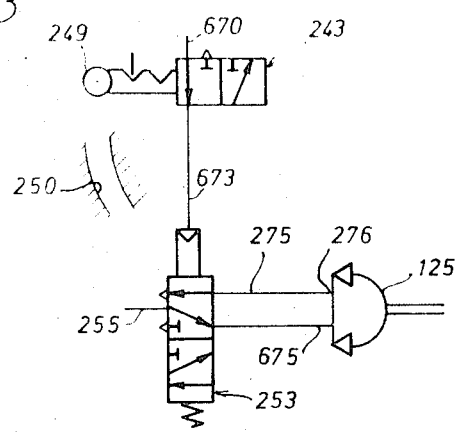
FIGS. 23-26 schematically illustrate various pneumatic circuits for controlling the pneumatic motors of apparatus.

FIG. 23 shows the switch 243 constituting a two-position valve controllable via the actuating roller 249 through the cam 250. Compressed air is supplied to the valve 243 through a conduit 670. The valve 243 via a conduit 673 is connected to the two-position valve 253 which through conduits 275 and 675 is in turn connected to the pneumatic motor 125.

The pneumatic circuit controlling the operation of each pneumatic motor 283 for driving the gripper means 38 is identical to the circuit shown in FIG. 23 and has, therefore, not been represented in the drawing.

Figure 24:
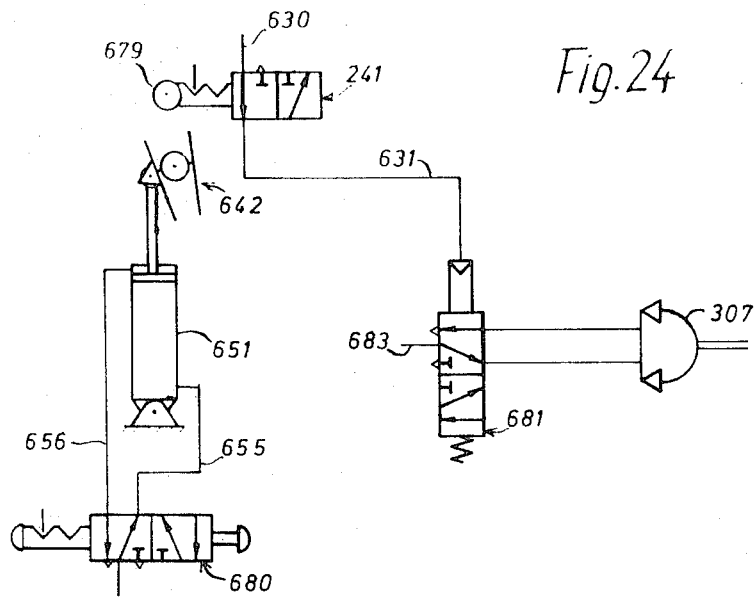

In FIG. 24 the pneumatic switch 241 has been illustrated as a two-position valve which is supplied with compressed air via conduit 630. An actuating roller 679 is cooperating with the mechanical shunt (cf. FIG. 22) whose cylinder 651 may be actuated through a manually controllable two-position valve 680 as soon as the machine operator detects glass in the molds 56 within the checking angle 120 (FIG. 2) or determines some other malfunction of the machine which necessitates temporary interruption of the usual operational cycle of certain machine elements. The valve 241 through conduit 631 is connected to another two-position valve 681 which is supplied with compressed air via a conduit 683 and is connected to the pneumatic motor 307 for driving the plunger 35.

Figure 25:
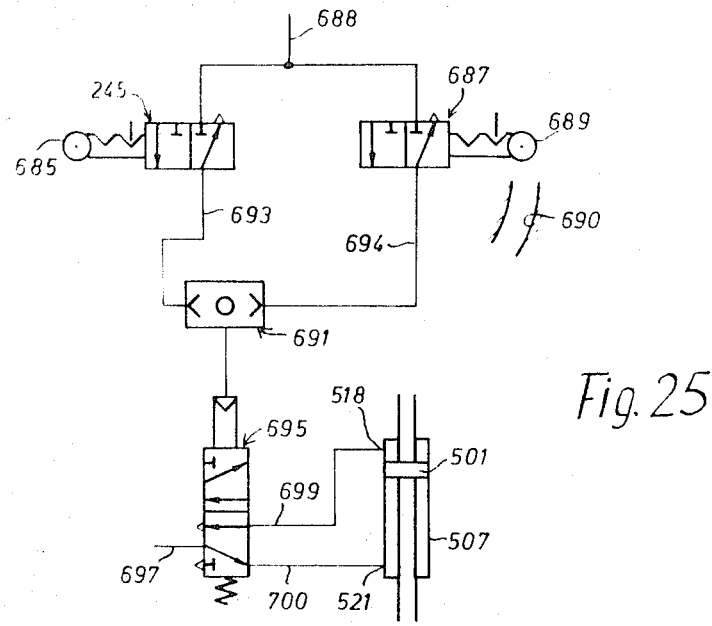

In FIG. 25 the pneumatic switch 245 is again a two-position valve including an actuating roller 685 which is likewise cooperating with the mechanical shunt 642 (cf. FIG. 22). Compressed air is supplied to the valve 245 and again to another two-position valve 687 via a conduit 688. An actuating roller 689 of the latter valve 687 is cooperating with a stationary cam 690.

Both the valves 245 and 687 are connected to a double check valve 691 through conduits 693 and 694, respectively. The double check valve 691 controls a two-position valve 695 which is supplied with compressed air via a conduit 697 and is connected to the connecting sockets 518 and 521 of the lifting cylinder (FIG. 17) through conduits 699 and 700).

In normal operation, the positions of valve 695 are controlled exclusively by cam 690 controlled valve 687. Only in emergency situations, when valve 680 (FIG. 24) is actuated, will the valve 245 take over control and assure that valve 695 stays in its lower switching position in which the lifting piston 501 is moved or held in its lowermost position. This way damage to or by parts carried by the lifting piston 501 is prevented during continuing turning of the turntable 95.

Figure 26:
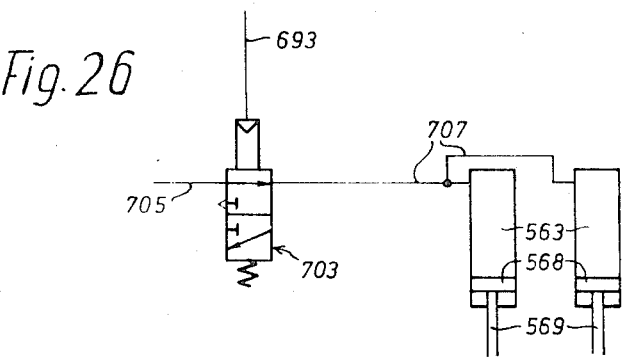

In FIG. 26 only the conduit 693 of valve 245 has been shown for simplification purposes. This conduit 693 is connected to a two-position valve 703 which is supplied with compressed air via a conduit 705 and is connected to the coupling cylinders 563 (FIG. 17) through a conduit 707 for the aforementioned reasons.

It will be understood that each of the elements described above, or two or more together, may also find a useful application in other types of method and machine for feeding gobs of vitreous or plastic material into a machine for forming bottles and similar hollow articles differing from the types described above.

While the invention has been illustrated and described as embodied in a method and apparatus for the aforementioned kind in which each mold is momentarily arrested when axially aligned with gob feeding means so that the gob may be dropped in vertical direction thereinto, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of the present invention and, therefore, such adaptations should and are intended to be comprehended within the meaning and range of equivalence of the following claims.

What is claimed as new and desired to be protected by Letters Patent is set forth in the appended claims.

We claim:

1. In a machine for forming bottles or similar containers from vitreous or plastic material, a combination comprising a turntable having an axis and an endless track means extending about said axis and defining a predetermined path; at least one carriage mounted on said track means movable along said predetermined path; upright mold means on said carriage; a loading station at a point of said path and comprising stationary gob supply means for dropping a gob of vitreous or plastic material in vertical direction into said mold means; first drive means for driving said turntable with a predetermined uniform speed about its axis; means cooperating with said carriage and said turntable for coupling said carriage to said turntable for movement therewith and for decoupling said carriage from said turntable so that the carriage may move along said track means relative to said turntable; and second drive means for moving said carriage, when decoupled from said turntable, relative to the latter, between a first point along said path upstream of said loading station and a second point downstream thereof and for arresting said carriage at said loading station for such a time that the carriage arrives at said second point at the same time as if the carriage would have moved between said points together with said turntable at said predetermined uniform speed, said second drive means comprising a pneumatic motor mounted on said turntable for movement therewith and having a drive shaft, a drive arm fixed to said drive shaft for turning therewith and linked to said carriage, and control means comprising a pilot arm fixed at one end to said drive shaft for turning therewith, a connecting rod pivotably connected at one end to the other end of said pilot arm, a roller mounted on the other end of said connecting rod, stationary pilot track means along which said roller moves, and elongated guide means connected to said roller and mounted on said turntable movable relative thereto in substantially radial direction.

2. A combination as defined in claim 1, and including means for substantially compensating the inertia forces and moments resulting from the movement of said second drive means and the resulting movement of said carriage relative to said turntable.

3. A combination as defined in claim 2, wherein said machine comprises a plurality of carriages, mold means in each of said carriages and second drive means for each of said carriages, and wherein said compensating means comprises a member having a turning axis parallel to the turning axis of said turntable, and being connected to said turntable to be rotated by the latter about said turning axis, a pair of pins mounted on said member on opposite sides of said turning axis, two pairs of weights located outside said member on opposite sides of said turning axis, stationary guide means for guiding said weights movable towards and away from said turning axis, and two connecting rods for each pin pivotally connected at one end to the respective pin and projecting to opposite sides of the latter and respectively connected at the other end to one weight of each pair of weights so that during turning of said member about its turning axis the weights in each pair will be reciprocated in opposite directions.

4. A combination as defined in claim 1, and including coupling means movable between an active position for coupling said mold means to said carriage and an inactive position freeing said mold means for movement relative to said carriage, plunger means carried by said turntable and axially aligned with said mold means during movement of the latter between said second point and said first point along said predetermined path, and lifting means carried by said turntable and cooperating with said mold means downstream of said second point and after said coupling means has been moved to said inactive position for lifting said mold means from said carriage in axial direction into a position cooperating with said plunger means for press forming a gob dropped at said loading station into said mold means into a parison.

5. A combination as defined in claim 4, and including a neck ring alignable with said mold means during the movement thereof along said path between said second and said first point, two-part gripper means carried by said turnable movable between an open position and a closed position for engaging in said closed position said neck ring and said mold means while the latter is in said lifted position for holding said mold means in said lifted position aligned with said neck ring, and wherein said lifting means returns said mold means after press forming the gob into a parison and movement of said gripper means to said open position onto said carriage, said parison extending through said neck ring and being carried by the latter when said mold means is returned to its position on said carriage.

6. A combination as defined in claim 5, wherein said lifting means comprises a lifting cylinder mounted on said turntable, piston means reciprocable in said lifting cylinder between a rest position and a lifting position, a lifting member carried by said piston means, means carried by said lifting member and cooperating during movement of said piston means from said rest to said lifting position with said coupling means for moving the latter to said inactive position, and cooperating means on said mold means and said lifting member for coupling said mold means to said lifting member during movement of said piston means from said rest to said lifting position and for decoupling said mold means from said lifting member during movement of said piston means in the opposite direction.

7. A combination as defined in claim 6, and including at least one coupling cylinder formed in said piston means and extending in the same direction as said lifting cylinder, a coupling piston arranged in said coupling cylinder movable between a lower rest position and an upwardly displaced position, a leg connected at one end to said coupling piston for movement therewith and projecting from the latter downwardly beyond said lifting cylinder, a roller co-nected to the other end of said leg, a stationary curved pilot lifting track in which said roller is guided, passage means communicating with said coupling cylinder in the region of the upper end thereof, and means for selectively connecting said passage means to the atmosphere and to a source of compressed air, said coupling piston engaging in said lower rest position a shoulder formed in said coupling cylinder so as to form stop means for limiting upward movement of said piston means.

8. A combination as defined in claim 7, wherein said piston means comprises a piston, and upper and a lower piston rod respectively projecting axially aligned with said piston to opposite sides of the latter, and including an outer coupling cylinder forming a downward continuation of said lifting cylinder, said lower piston rod extending with clearance into said outer coupling cylinder, sealing means sealing the lower end of said lower piston rod against the inner surface of said outer coupling cylinder, and passage means communicating with an upper portion of said outer coupling cylinder for feeding compressed air into the latter.

9. A combination as defined in claim 8, wherein said outer coupling cylinder has a bottom wall, a guide rod having an axis parallel to that of said outer coupling cylinder and being fixed to said bottom wall, said piston means being provided with a bore into which said guide rod extends.

10. A combination as defined in claim 6, wherein said piston means is formed with a bore extending in axial direction therethrough, said lifting member comprises a tube arranged axially adjustable in said bore of said piston means and including sealing means sealing said bore in said rest position of said piston means while permitting passage of air through said bore and said tube when said piston means moves away from said rest position.

11. A combination as defined in claim 10, wherein each of said mold means comprises a hollow mold housing open at opposite ends so that the inner surface of said mold housing forms a passage for flow of cooling air therethrough, and at least one mold mounted in said mold housing spaced from the inner surface thereof, said tube of said lifting means communicating with said passage when said piston means moves away from said rest position thereof, and wherein said coupling means releasably couples said mold housing to the respective carriage.

12. A combination as defined in claim 4, and including a pair of pneumatic means for respectively operating said plunger means and said lifting means, each of said pneumatic means comprising a pneumatic switch tiltably mounted on said turntable for movement therewith about the axis of said turntable, a switch lever fixed at one end to said switch and having an actuation roller on the other end thereof, and control means cooperating with said roller for turning said pneumatic switch between two stable operating positions, said control means comprising an adjustable mechanical shunt mounted adjacent said turntable and having two tongues which define between themselves a passage through which said actuation roller passes during turning of said turntable relative to said shunt, said passage having a wide inlet end and a shiftable narrow outlet end so that said pneumatic switch means may be turned to either of its switching positions depending on the adjusted position of said outlet end of said shunt.

13. A combination as defined in claim 12, wherein said tongues are held in fixed position relative to each other and means connected to said shunt for adjusting the position of said outlet end of said passage.

* * * * *